United States Patent
Takenaka et al.

(10) Patent No.: US 6,967,456 B2
(45) Date of Patent: *Nov. 22, 2005

(54) DEVICE FOR ABSORBING FLOOR-LANDING SHOCK FOR LEGGED MOBILE ROBOT

(75) Inventors: Toru Takenaka, Wako (JP); Hiroshi Gomi, Wako (JP); Kazushi Hamaya, Wako (JP); Yoshinari Takemura, Wako (JP); Takashi Matsumoto, Wako (JP); Takahide Yoshiike, Wako (JP); Yoichi Nishimura, Wako (JP); Kazushi Akimoto, Wako (JP); Taro Yokoyama, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 10/499,117

(22) PCT Filed: Dec. 11, 2002

(86) PCT No.: PCT/JP02/12981

§ 371 (c)(1),
(2), (4) Date: Jun. 17, 2004

(87) PCT Pub. No.: WO03/055650

PCT Pub. Date: Jul. 10, 2003

(65) Prior Publication Data

US 2005/0077856 A1    Apr. 14, 2005

(30) Foreign Application Priority Data

Dec. 25, 2001  (JP) .............................. 2001-392788

(51) Int. Cl.[7] .............................................. B25J 5/00
(52) U.S. Cl. ............................. 318/568.12; 318/568.1; 318/568.11; 700/245; 700/264; 901/1
(58) Field of Search .... 318/568.1–568.12; 700/1–245; 901/1–49; 623/24–46

(56) References Cited

U.S. PATENT DOCUMENTS

| 2,605,474 | A | * | 8/1952 | Oliver ........................ 623/26 |
| 5,159,988 | A | * | 11/1992 | Gomi et al. ................. 180/8.6 |
| 5,455,497 | A | * | 10/1995 | Hirose et al. .......... 318/568.12 |
| 6,645,253 | B2 | * | 11/2003 | Caspers ....................... 623/26 |
| 6,761,742 | B2 | * | 7/2004 | Caspers ....................... 623/34 |
| 2005/0011685 | A1 | * | 1/2005 | Takenaka et al. ............ 180/8.6 |

FOREIGN PATENT DOCUMENTS

| JP | 05-293776 | 11/1993 |
| JP | 05-305578 | 11/1993 |
| JP | 06-039755 | 2/1994 |
| JP | 10-277969 | 10/1998 |
| JP | 11-033941 | 2/1999 |
| JP | 11-320461 | 11/1999 |

OTHER PUBLICATIONS

Hong, Y.S. et al, "Design and Experimental Test of a New Robot Foot for Quadrupedal Jointed-Leg Type Walking Robot", 1996, IEEE, pp. 317-322.*

Yamaguchi, Jin'ichi et al., "Experimental Development of a Foot Mechanism with a Shock Absorbing Material for Acquisition of Landing Surface Position Information and Stabilization of Dynamic Biped Walking", 1995, IEEE, pp. 2892-2899.*

* cited by examiner

Primary Examiner—Marlon T. Fletcher
Assistant Examiner—Tyrone Smith
(74) Attorney, Agent, or Firm—Rankin, Hill, Porter & Clark LLP

(57) ABSTRACT

A landing shock absorbing device 18 provided in a foot mechanism 6 of a leg of a robot comprises an inflatable and compressible bag-like member 19 (a variable capacity element) on a bottom face side of the foot mechanism 6. The bag-like member 19 is constructed of an elastic material such as rubber. Air in the atmosphere can flow into and out of the bag-like member 19 by inflow/outflow means 20 provided with a solenoid valve 27 and the like. In a landing state of the foot mechanism 6 and in a state immediately after the foot mechanism shifts from the landing state to a lifting state, the solenoid valve 27 is closed to maintain the bag-like member 19 in a compressed state. Furthermore, during the bag-like member 19 in the inflating state during the lifting state of the foot mechanism 6, by controlling timing when the solenoid valve 27 is switched from a valve opening state to a valve closing state, a height of the bag-like member 19 in a compression direction is controlled to be a height suitable for a gait type of the robot. Thereby, posture stability of the robot can be secured easily while reducing a impact load in the landing motion of the leg of the legged mobile robot, and further, a lightweight configuration can be achieved.

17 Claims, 14 Drawing Sheets

FIG. 15
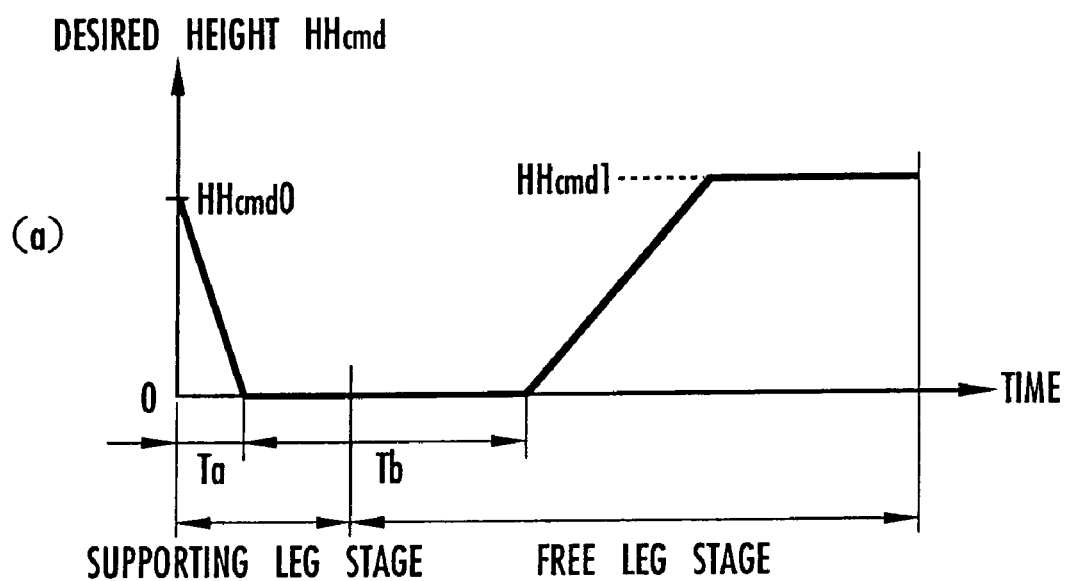
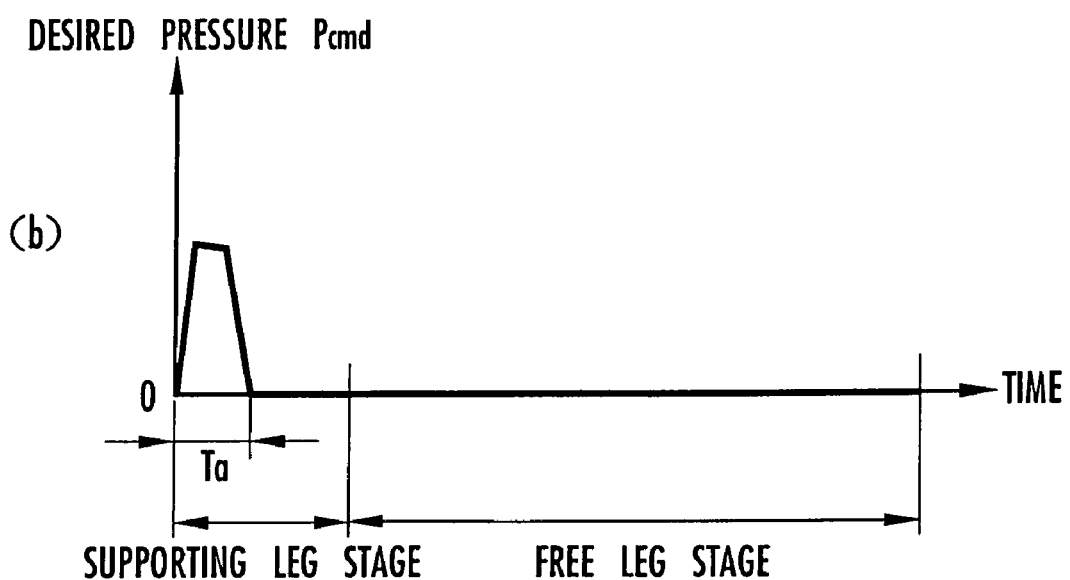

DEVICE FOR ABSORBING FLOOR-LANDING SHOCK FOR LEGGED MOBILE ROBOT

TECHNICAL FIELD

The present invention relates to a landing shock absorber for reducing an impact load during a landing motion of a leg of a legged mobile robot.

BACKGROUND ART

In a legged mobile robot such as a biped mobile robot equipped with a plurality of legs, each leg is brought into contact with a floor through a ground-contacting face portion of a foot mechanism provided on a far end portion thereof. More particularly, the foot mechanism is a mechanism connected to a joint on the farthest end side of each leg (an ankle joint). The legged mobile robot moves by lifting and landing motions of each leg. More particularly, the lifting and landing motions are a repetition of motions that while at least one leg of a plurality of legs as a supporting leg maintains a foot mechanism of the supporting leg in a ground-contacting state, the other leg as a free leg lifts a foot mechanism of the free leg from its ground-contacting location into the air and moves the same, and makes contact with the ground on other ground-contacting location.

In such a legged mobile robot, when a ground-contacting face portion of a foot mechanism of the leg is brought into contact with the ground by the landing motion of each leg, a relatively great impact load (a transient floor reaction force) instantaneously acts through the foot mechanism of the leg. Particularly, when the legged mobile robot is moved at relatively high moving speed, motion energy of the leg in moments immediately before the foot mechanism of the leg makes contact with the ground is great, so that the impact load will be high. When this impact load is high, rigidity of each portion of each leg needs to be enhanced in order to resist the load, and furthermore, this will interfere with a size reduction and a weight reduction of each leg. Accordingly, a reduction (shock absorption) of such an impact load is desired.

As such a shock absorber, for example, the one that the present applicant proposed in Japanese Patent Laid-Open Publication No.5-305578 is known. In this shock absorber, a cylinder filled with hydraulic oil is provided at a heel of the foot mechanism, and a rod is extendedly provided from a piston slidable in this cylinder toward a bottom face side of the heel of the foot mechanism. A ground-contacting element widened in diameter in a mushroom shape is provided on a tip portion of the rod. Additionally, the piston is energized in a direction that the ground-contacting element projects to the bottom face side of the foot mechanism by a spring accommodated in the cylinder on the upper side thereof. Furthermore, in the piston, a flow passage that allows the hydraulic oil to flow between an upper chamber and a lower chamber thereof is drilled.

In the shock absorber configured in this manner, at the time of the landing motion of the leg, the aforementioned ground-contacting element makes contact with the ground and is pressed with the piston in a direction opposite to an energizing force of the spring. At this moment, while the hydraulic oil in the cylinder flows through the flow passage of the piston, the piston slides in a direction that the piston compresses the spring, and this allows the impact load during the landing motion of the leg to be reduced.

However, in such a shock absorber, in a landing state of the leg (a state of a supporting leg stage of the leg), since the ground-contacting element of the heel portion of the foot mechanism makes contact with the ground and is pressed against the energizing force of the spring, a floor reaction force constantly acts on the heel portion of the foot mechanism. Furthermore, in some gait types of the robot, the ground-contacting element may be still in contact with the ground immediately after the leg is lifted from the floor. Therefore, there are times when a lifting motion of the leg cannot be performed smoothly during the movement of the robot, and stumbling is caused. Additionally, in the landing state of the leg, since the floor reaction force constantly acts on the heel portion of the foot mechanism, the floor reaction force cannot be made to intensively act on a desired position of the foot mechanism (for example, tiptoe or the like) to secure posture stability of the robot. Therefore, the posture stability of the robot is apt to be impaired by a geometry of a floor, external force or the like.

Furthermore, in the shock absorber, as a result of the use of the hydraulic oil, weight of the shock absorber will be heavy, resulting in interfering with a weight reduction of the robot. Additionally, the ground-contacting element that makes contact with the ground during the landing motion of the leg can only move in a sliding direction of the piston (an axial center direction of the cylinder) and is a solid body. Consequently, the impact load acting on the ground-contacting element may act in a direction that crosses a movable direction thereof depending on a geometry of a floor, so that the impact load may not adequately be reduced, and damage of the shock absorber may be generated.

The present invention is achieved in the light of such a background, and it is the object to provide a landing shock absorber which can easily secure posture stability of a legged mobile robot while reducing an impact load during a landing motion of a leg of the robot, and further, which can be configured to be lightweight.

DISCLOSURE OF INVENTION

To achieve such an object, a landing shock absorbing device of a legged mobile robot of the present invention is characterized in that in the legged mobile robot moving by lifting and landing motions of a plurality of legs that can make contact with the ground through a ground-contacting face portion of a foot mechanism, respectively, there are a variable capacity element provided in the foot mechanism of the leg to be compressed by undergoing a floor reaction force during the landing motion of each leg and to be inflatable when no longer undergoing the floor reaction force at least by the lifting motion of the leg, thereby allowing fluid to flow into and flow out of an interior portion thereof with the inflation and the compression thereof, and inflow/outflow means for flowing the fluid into the variable capacity element while inflating the variable capacity element in a lifting state of each leg and flowing the fluid out of the variable capacity element with the compression of the variable capacity element caused by the floor reaction force, that outflow resistance is generated during the outflow of the fluid in the variable capacity element by the inflow/outflow means, and that there is provided compressed state maintaining means for maintaining the variable capacity element in the compressed state in a period from after the variable capacity element is compressed at least by the landing motion of each leg until immediately after the leg enters the lifting state by the lifting motion thereof (a first invention).

In the present invention, the landing motion of each leg denotes a motion for moving down the foot mechanism to allow the ground-contacting face portion to make contact with a floor from a state that the ground-contacting face portion of the foot mechanism of the leg is lifted from the floor, and the lifting motion of each leg denotes a motion for lifting the foot mechanism into the air to remove the ground-contacting face portion from the floor from a state that the ground-contacting face portion of the foot mechanism of the leg is brought in contact with the floor. Additionally, the lifting state of each leg or the foot mechanism denotes a state that the ground-contacting face portion of the foot mechanism of the leg is removed from the floor. Moreover, the landing state of each leg or the foot mechanism denotes a state that the entire or a partial ground-contacting face portion of the foot mechanism of the leg is brought into contact with the floor.

According to the present invention as described above (the first invention), in the landing motion of each leg, the variable capacity element in the inflated state is compressed, and the fluid inside of the variable capacity element flows out of the variable capacity element with the outflow resistance by the inflow/outflow means. Thereby, motion energy of the leg performing the landing motion is absorbed to decrease a motion amount of the foot mechanism of the leg, thereby reducing an impact load acting on the leg in the landing motion. In addition, according to the present invention (the first invention), the variable capacity element compressed in the landing motion of each leg is maintained in the compressed state by the compressed state maintaining means in a period from after being compressed at least by the landing motion of each leg until immediately after the leg enters the lifting state by the lifting motion thereof. Therefore, the floor reaction force acting on the variable capacity element in the landing state of the leg after the compression of the variable capacity element can be reduced as much as possible, and basically, the floor reaction force can act on only the ground-contacting face portion of the foot mechanism. As a result, posture stability of the robot can be secured easily by the posture control of the foot mechanism and the like. Furthermore, when the leg shifts from the landing state to the lifting state by the lifting motion of the leg, and immediately after the shift, the variable capacity element can be maintained in the compressed state, so that the lifting motion of the leg can be smoothly performed without causing stumbling of the robot or the like.

Accordingly, according to the present invention (the first invention), posture stability of the legged mobile robot can be secured easily while reducing the impact load during the landing motion of the leg of the robot.

In the present invention (the first invention), it is preferable that the timing immediately after the leg enters the lifting state by the lifting motion thereof (end timing of the period when the variable capacity element is maintained in the compressed state by the compressed state maintaining means) is timing at which the variable capacity element and movable portions integrally with the same, or portions moving integrally with the foot mechanism during the motion of the leg such as the bottom face portion of the foot mechanism and the like do not make contact with the ground even if the variable capacity element inflates after the timing.

In the present invention as described above (the first invention), it is preferable that the fluid comprises a compressible fluid (a second invention). Specifically, since the compressible fluid has a spring property, a part of motion energy of the leg is converted into elastic energy of the compressible fluid inside of the variable capacity element in the landing motion of each leg. Then, the elastic energy dissipates by the outflow resistance in the process in which the compressible fluid flows out of the variable capacity element with the compression of the variable capacity element. As a result, in the landing motion of each leg, the impact load (hereinafter, it may be referred to as a landing shock) can be effectively reduced while avoiding an instantaneous rapid change in the floor reaction force acting on the leg through the variable capacity element and the compressible fluid inside of the variable capacity element.

As the compressible fluid, a gas such as air, liquid containing air bubbles, gel or the like is exemplified. In this case, particularly in the case where a gas is used as the compressible fluid, the compressible fluid becomes lightweight, whereby the landing shock absorbing device of the present invention can be lightweight.

The present invention using the compressible fluid as described above (the second invention) is preferable in the case where the legged mobile robot is a robot that a position and a posture of the foot mechanism are controlled by compliance control so as to allow a moment about an axis in a horizontal direction for the floor reaction force acting on the foot mechanism of each leg to follow a predetermined desired moment (a third invention). That is to say, since a spring constant of the compressible fluid is decreased due to the compression of the variable capacity element by the landing motion of the leg, a gain of the control (compliance gain) can be increased while securing stability of a control system of the compliance control. As a result, the following-property of the moment about the axis in the horizontal direction acting on each of the foot mechanisms to the desired moment can be enhanced. Accordingly, posture stability of the robot can be secured while properly reducing the impact load when landing the floor.

Furthermore, in the present invention (the first through third inventions), it is preferable that the variable capacity element is constructed of a deformable bag-like member provided on a bottom face side of the foot mechanism of the leg to make contact with the ground ahead of the ground-contacting face portion of the foot mechanism of the leg during the landing motion of each leg (a fourth invention). That is to say, the bag-like member makes contact with the ground ahead of the ground-contacting face portion of the foot mechanism of the leg in the landing motion of each leg and is compressed. At this time, since the bag-like member can be deformed along a surface geometry of the floor, a shock absorbing function of the landing shock absorbing device of the present invention can be exerted regardless of the geometry of the floor or the like as long as the bag-like member can make contact with the ground. Accordingly, reliability of reduction effect of the impact load during the landing motion of the leg can be enhanced. Furthermore, since the bag-like member has a high flexibility in deformation, the situation of damaging the bag-like member can be avoided even when the floor reaction force acts on the bag-like member from various directions in the landing motion of each leg.

In the present invention (the first through fourth inventions), it is preferable that the compressed state maintaining means maintains the variable capacity element in the compressed state by blocking off inflow of the fluid into the variable capacity element at least by the inflow/outflow means (a fifth invention).

According to this, a solenoid valve provided in a flow passage of the fluid to the variable capacity element or the like can be used to maintain the variable capacity element in the compressed state with a simple structure and with ease. The variable capacity element can be dynamically maintained in the compressed state by mechanical means or electromagnetic force means engaged with the variable capacity element.

Furthermore, in the present invention (the first through fifth inventions), the compressed state maintaining means judges a period of time when the variable capacity element is maintained in the compressed state based on time information of the lifting/landing motions of each leg that is determined according to a desired gait during the movement of the legged mobile robot for example (information as to at what time the foot mechanism of each leg is brought into contact with the ground or the like) (a sixth invention). According to this, the control for maintaining the variable capacity element in the compressed state can be performed easily without using a sensor.

Alternatively, in the present invention (the first through fifth inventions), the landing shock absorbing device comprises a sensor for detecting whether or not the foot mechanism of each leg is in contact with the ground through the ground-contacting face portion, and the compressed state maintaining means judges the period of time when the variable capacity element is maintained in the compressed state based on detection data of the sensor (a seventh invention). According to this, the variable capacity element can be reliably maintained in the compression sate in the desired period of time.

The judgment of the period of time when the variable capacity element is maintained in the compressed state may be made using both the time information of the lifting/landing motions of each leg according to the desired gait of the robot and the detection data of the sensor for detecting whether or not the foot mechanism is in contact with the ground.

Furthermore, in the present invention (the first through seventh inventions), it is preferable that the landing shock absorbing device comprises inflation control means for controlling an inflow amount of the fluid into the variable capacity element by the inflow/outflow means according to a gait type of the legged mobile robot so that a size (a length) of the variable capacity element in a compression direction becomes a predetermined size according to the gait type during the inflation of the variable capacity element in the lifting state of each leg (an eighth invention).

According to this, by controlling the inflow amount of the fluid into the variable capacity element before start of the compression of the variable capacity element by the landing motion of each leg, the size of the variable capacity element in the compression direction is controlled to be the predetermined size according to the gait type of the robot. Therefore, a compression amount of the variable capacity element by the landing motion of each leg and thus the outflow amount of the fluid from the variable capacity element can be matched with the gait type of the robot (for example, gait type such as movement speed). Consequently, an absorbing effect of landing shock by the landing shock absorbing device of the present invention can be made suitable for the gait type of the robot. That is to say, transitional change in the floor reaction force acting on the leg in the landing motion of each leg can be made suitable for the gait type of the robot, and thus posture stabilization of the robot can be achieved more properly.

Generally, it is preferable that the size of the variable capacity element in the compression direction before the landing motion of each leg is larger as the movement speed of the robot is higher. With such structure, as the movement speed of the robot is higher, the flow amount of the fluid flowing out of the variable capacity element during the compression of the variable capacity element becomes larger, thereby increasing its outflow resistance, which can enhance a damping effect (damping effect of motion energy) of the landing shock absorbing device.

In the present invention comprising the inflation control means as described above (the eighth invention), the inflation control means judges whether or not the size of the variable capacity element in the compression direction has inflated to the predetermined size, for example, based on inflow time of the fluid into the variable capacity element after the operation of maintaining the variable capacity element in the compressed state by the compressed state maintaining means is released, and when judging that the size of the variable capacity element in the compression direction has inflated to the predetermined size, the inflation control means blocks off the inflow of the fluid into the variable capacity element by the inflow/outflow means (a ninth invention). According to this, the inflation of the variable capacity element can be controlled with a relatively simple structure without requiring a sensor or the like.

Alternatively, the landing shock absorbing device comprises a sensor for detecting a physical quantity varying according to the size (length) of the variable capacity element in the compression direction, and the inflation control means judges whether or not the size of the variable capacity element in the compression direction has inflated to the predetermined size based on detection data of the sensor after the operation of maintaining the variable capacity element in the compressed state by the compressed state maintaining means is released, and when judging that the size of the variable capacity element in the compression direction has inflated to the predetermined size, the inflation control means blocks off the inflow of the fluid into the variable capacity element by the inflow/outflow means (a tenth invention). According to this, the final size of the variable capacity element in the compression direction when inflating the variable capacity element in the lifting state of each leg can be reliably controlled to be the predetermined size according to the gait type.

As the physical quantity varying according to the size of the variable capacity element in the compression direction, the length of the variable capacity element in the compression direction, a pressure inside of the variable capacity element and the like are exemplified.

Furthermore, in the present invention comprising the inflation control means (the eighth invention), it is also possible that the landing shock absorbing device comprises a first sensor for detecting a pressure inside of the variable capacity element and a second sensor for detecting the size (length) of the variable capacity element in the compression direction, and that the compressed state maintaining means and the inflation control means set a pattern of change with time of a desired pressure inside of the variable capacity element and a pattern of change with time of a desired size of the variable capacity element in the compression direction according to the gait type of the legged mobile robot, and control the inflow/outflow of the fluid into the variable capacity element by the inflow/outflow means so that the pressure and the size detected by the first sensor and the second sensor respectively vary in keeping with the patterns of change with time of the desired pressure and the desired size respectively (an eleventh invention).

According to this, both of the size of the variable capacity element in the compression direction and the pressure inside of the variable capacity element can be sequentially controlled to be suitable for the gait type of the robot. Accordingly, the shock absorbing effect by the landing shock absorbing device of the present invention and the posture stabilization effect of the robot can be enhanced.

BEST MODE OF CARRYING OUT THE INVENTION

Figure 1:
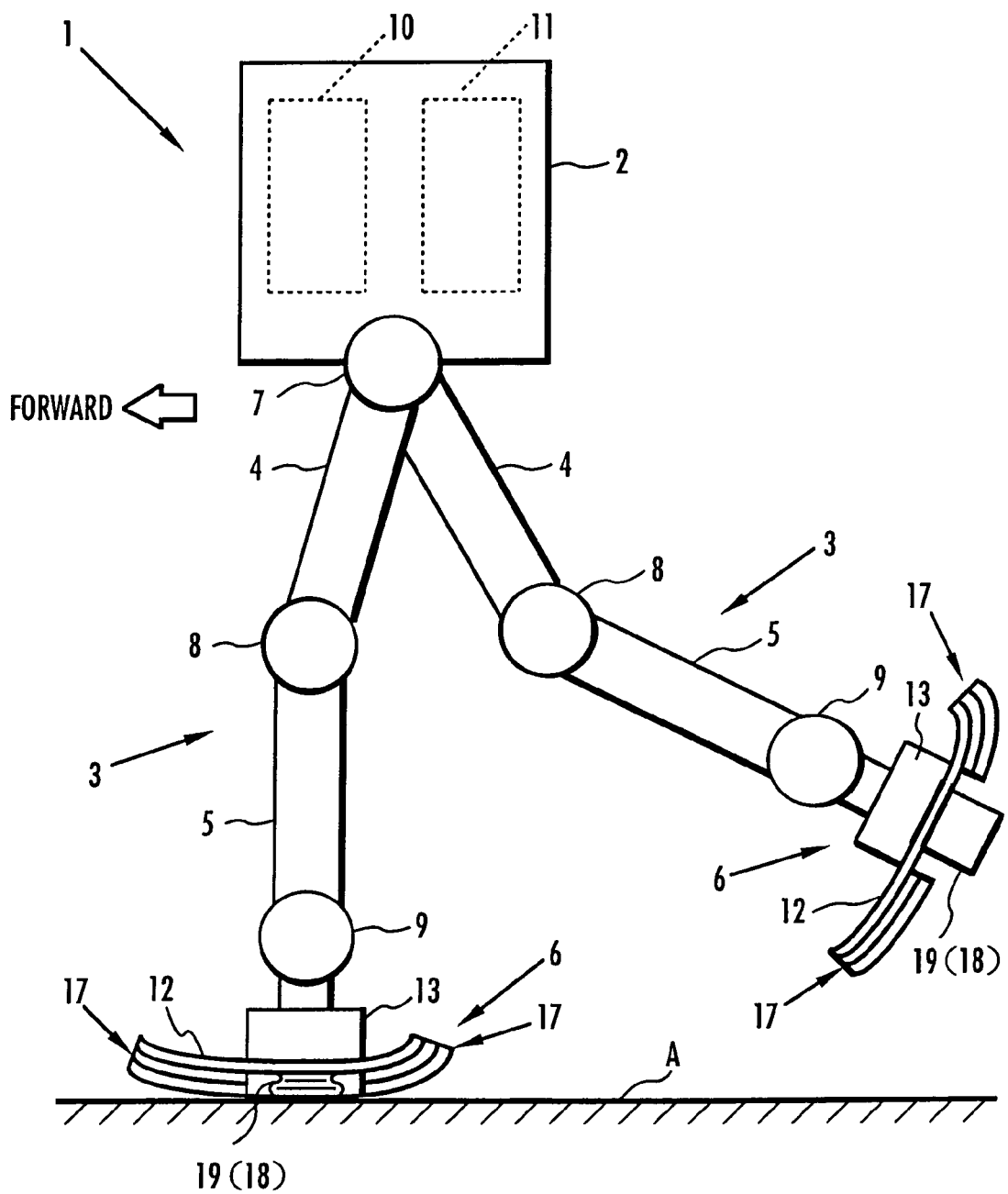
FIG. 1 is a side view showing a basic configuration of a legged mobile robot in an embodiment of the present invention.

Referring to FIGS. 1 through 6, a first embodiment of the present invention is described. FIG. 1 is a side view showing an overall basic configuration of a legged mobile robot of the present embodiment in schematic form. As shown in FIG. 1, for example, the legged mobile robot 1 of the present embodiment is a biped mobile robot comprising a pair of (two) legs 3, 3 extendedly disposed from a lower end portion of its upper body 2 (torso). Further, arms and a head may be attached on the upper body 2.

Each leg 3 is constructed by connecting a thigh 4, a lower leg 5, and a foot mechanism 6 in the order listed through a hip joint 7, a knee joint 8, and an ankle joint 9 from the lower end portion of the upper body 2. More specifically, each leg 3 is adapted to be configured with the thigh 4 extendedly disposed from the lower end portion of the upper body 2 through the hip joint 7, the lower leg 5 connected to a far end portion of the thigh 4 through the knee joint 8, and the foot mechanism 6 connected to a far end portion of the lower leg 5 through the ankle joint 9. Each leg 3 can be brought into contact with a floor A through the foot mechanism 6 presented on a distal end side thereof, and supports the upper body 2 by this ground contact. In this situation, the hip joint 7 of each leg 3 is adapted to be capable of rotary motions about three axes in an upward/downward direction, a forward/backward direction, and a right/left direction, the knee joint 8 is adapted to be capable of a rotary motion about one axis in the right/left direction, and the ankle joint 9 is adapted to be capable of rotary motions of two axes in the forward/backward direction and the right/left direction of the robot 1. According to the rotary motions of respective joints 7 through 9, each leg 3 is adapted to be capable of performing a movement substantially the same as a human leg.

Additionally, the respective joints 7 through 9 of each leg 3 is provided with an electric motor (not shown) as an actuator for performing the rotary motion about each axis. Furthermore, the upper body 2 of the robot 1 is equipped with a controller 10 for controlling motions of the legs 3, 3 of the robot 1 (a motion control for the electric motor of the respective joints 7 through 9), and a battery 11 as an electric source for a motion of the robot 1, etc. The controller 10 is constructed of an electric circuit including a microcomputer, etc. In this situation, in moving the robot 1, the controller 10 attempts to move the robot 1 like a human by alternately repeating a lifting and a landing motions for the two legs 3, 3. More specifically, a repetition of the lifting and landing motions is an action as follows. In other words, either one of the two legs 3, 3 is taken as a supporting leg and the other as a free leg. In a state that the leg 3 on a supporting leg side is landed on the floor (the foot mechanism 6 of the leg 3 is brought into contact with the floor A), the leg 3 on a free leg side is lifted (the foot mechanism 6 of the leg 3 is lifted from the floor A into the air). Furthermore, the lifted foot mechanism 6 of the leg 3 on the free leg side is moved in the air, and then landed on a desired place. The landed leg 3 on the free leg side is, then, newly taken as the supporting leg and the leg 3 which has been taken as the supporting leg is newly taken as the free leg, and the leg 3 newly taken as the free leg is moved as described above. Such a repetition of the motion of the legs 3, 3 is the repetition of the lifting and landing motions of the legs 3, 3 during the movement of the robot 1.

Figure 2:
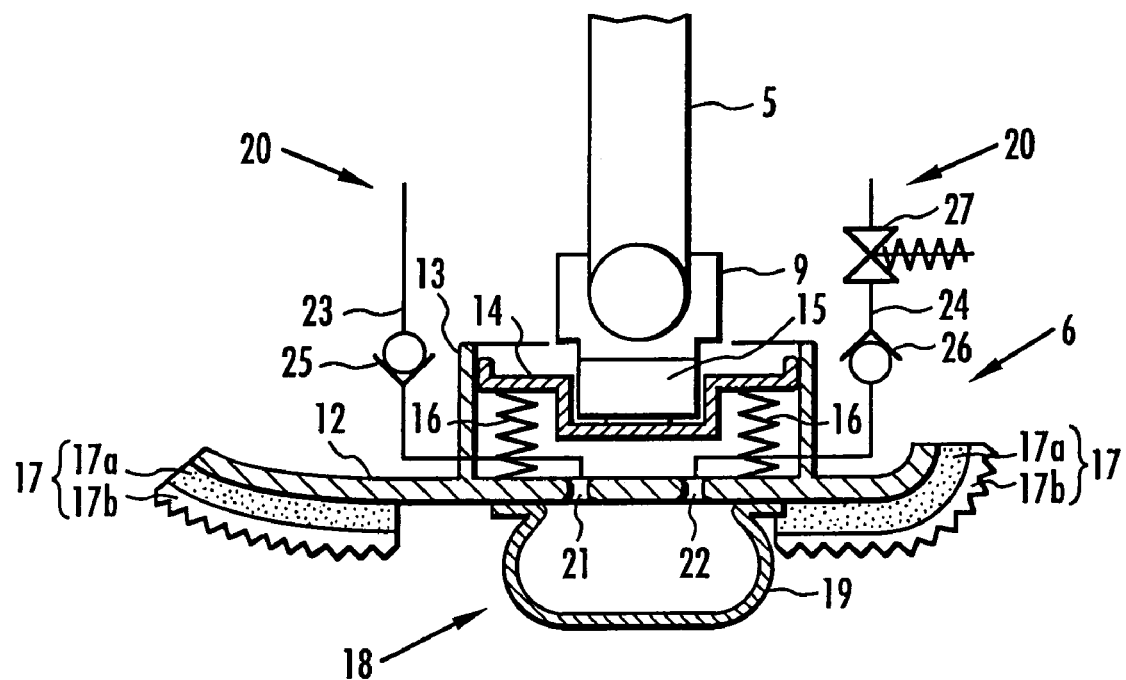
FIG. 2 is a cross-sectional view showing a side face of a foot mechanism provided with a landing shock absorbing device of a first embodiment of the present invention.
Figure 3:
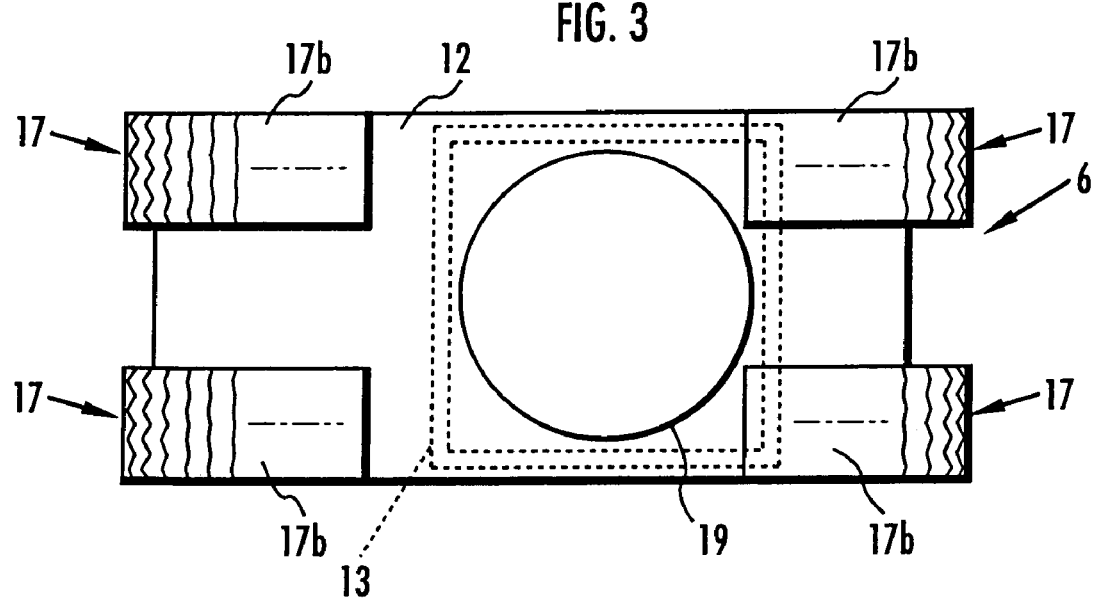
FIG. 3 is a plan view viewed from a bottom face side of the foot mechanism of FIG. 2.

Referring to FIG. 2 and FIG. 3, a configuration of the foot mechanism 6 of each leg 3 is further described. FIG. 2 is a cross-sectional view showing a side face of the foot mechanism 6, and FIG. 3 is a plan view viewed from a bottom face side of the foot mechanism 6.

The foot mechanism 6 is provided with a foot plate member 12 in a generally tabular form as a skeletal member. The foot plate member 12 is designed with its front end portion (toe portion) and its rear end portion (heel portion) each curved slightly upward, but otherwise in a flat tabular form. In addition, on a top face portion of the foot plate member 12, a tube member 13 in a cross-sectionally rectangular form is fixedly provided with its axis in a vertical direction. Inside of the tube member 13, a movable plate 14, which is disposed to be movable substantially in the vertical direction to be arranged along an inner circumferential surface of the tube member 13, is provided and the movable plate 14 is connected to the ankle joint 9 through a six-axis force sensor 15. The six-axis force sensor 15 detects a floor reaction force acting on the foot mechanism 6 (specifically, a translational force of three axis directions in a forward/backward direction, a right/left direction, and an upward/downward direction, and moment about three axes), and its detected output is input into the controller 10.

Additionally, the movable plate 14 is connected to the top face portion of the foot plate member 12 through a plurality of elastic members 16 (described as a spring in FIG. 2) with a peripheral portion of its lower face constructed of a spring, rubber, or the like. Therefore, the foot plate member 12 is connected to the ankle joint 9 through the elastic member 16, the movable plate 14 and the six-axis force sensor 15. Further, the interior portion of the tube member 13 (a space under the movable plate 14) is opened to an atmospheric side through a hole or a gap which is not shown, so that the air in the atmosphere can freely come into and go out of the interior portion of the tube member 13.

Ground-contacting members 17 are attached to the bottom face (the lower face) of the foot plate member 12. The ground-contacting members 17 are elastic members intervened between the foot plate member 12 and the floor when the foot mechanism 6 is landed (an elastic member that directly makes contact with the floor), and fixed to four corners of the ground-contacting surface of the foot plate member 12 (both sides of the toe portion and both sides of the heel portion of the foot plate member 12) in the present embodiment. Additionally, in the present embodiment, the ground-contacting members 17 are formed in a two-layer structure in which a soft layer 17a made of a relatively soft rubber material and a hard layer 17b made of a relatively hard rubber material are vertically polymerized, and the hard layer 17b is provided on the lowest face side thereof as a ground-contacting face portion directly making contact with the floor during the landing of the leg 3.

The foot mechanism 6 is provided with a landing shock absorbing device 18 associated with the present invention in addition to the above configuration. The landing shock absorbing device 18 is provided with a bag-like member 19 attached to the bottom face of the foot plate member 12, and inflow/outflow means 20 for flowing the air (the air in the atmosphere) as compressible fluid into and out of the interior portion of the bag-like member 19.

The bag-like member 19 is provided substantially in the center portion of the bottom face of the foot plate member 12 in such a manner that the ground-contacting members 17 are presented around a periphery thereof. This bag-like member 19 is deformably structured of an elastic material such as rubber or the like, so that an upwardly opened barrel-type container shape with a bottom is presented as shown in FIG. 2 in a natural state that an elastic deformation is not generated by external forces. The bag-like member 19 is designed with all the opened end portion thereof being firmly fixed on the bottom face of the foot plate member 12 and being shut and covered with the foot plate member 12. Additionally, in a natural state that the bag-like member 19 is presented in the barrel-type container shape with a bottom, the bottom face of the bag-like member 19 is provided to protrude lower than the ground-contacting members 17. In other words, a height of the bag-like member 19 (a distance from the lower face of foot plate member 12 to the bottom face of the bag-like member 19) is adapted to be taller than a thickness of the ground-contacting members 17. Accordingly, in a state that the foot plate member 12 is brought into contact with the ground through the ground-contacting members 17 (the landing state of the leg 3), the bag-like member 19 is compressed in a height direction of the bag-like member 19 by a floor reaction force, as shown about the leg 3 in the landing state in FIG. 1 (the leg 3 on a forward side of the robot 1 in FIG. 1).

The natural state that the bag-like member 19 is presented in the barrel-type container shape with a bottom is an inflated state of the bag-like member 19 and in this inflated state, the bag-like member is filled with air under a pressure equivalent to the atmospheric pressure through the inflow/outflow means 20 described below. The bag-like member 19 is constructed of the elastic material, resulting in having a shape restoring force into a shape in the natural state (the barrel-type container shape with a bottom) when compressed. The shape of the bag-like member 19 in the natural state does not always need to be barrel type, but may be a cylindrical shape with a bottom, for example.

The inflow/outflow means 20 is provided with two flow holes (flow passages) 21 and 22 drilled in the foot plate member 12 so as to communicatively connect the interior portion of the bag-like member 19 and the interior portion of the tube member 13, and fluid conduits 23 and 24 (flow passages) connected to the respective flow holes 21 and 22 inside of the tube member 13 and led to the outside of the tube member 13. Far end portions of these fluid conduits 23 and 24 (ends on the opposite side of the bag-like member 19) are opened to the atmosphere. In addition, the fluid conduit 23 is provided with a check valve 25 for blocking air from flowing into the bag-like member through the conduit. Furthermore, the fluid conduit 24 is provided with a check valve 26 for blocking air in the bag-like member 19 from flowing out through the conduit, and a solenoid valve 27 capable of being controlled for opening and closing by the controller 10. Here, in FIG. 2, for convenience, the fluid conduits 23 and 24, and the check valves 25 and 26 and the solenoid valve 27 which are provided in the conduits are illustrated as they are provided away from the foot mechanism 6 or the like. However, these are actually attached in a proper place of the leg 3 such as the foot mechanism 6, or housed inside of the tube member 13. According to the present embodiment, the flow holes 21 and 22 are throttled passages, and an opening area of the flow hole 21 is smaller than that of the flow hole 22.

In the inflow/outflow means 20 configured in this manner, when the bag-like member 19 is compressed, air in the bag-like member 19 flows out to the atmosphere through the flow hole 21 and the fluid conduit 23. Furthermore, in a state that the solenoid valve 27 is opened, air in the atmosphere flows into the bag-like member 19 through the fluid conduit 24 and the flow hole 22 as the bag-like member 19 inflates from the compressed state to the natural state by the shape restoring force. In addition, when the air flows in and out with respect to the bag-like member 19, fluid resistance is generated by the flow holes 21 and 22 as the throttled passages. In this case, since the opening area of the flow hole 21 is smaller, the outflow resistance of the air from the bag-like member 19 is relatively large. In contrast, since the opening area of the flow hole 22 is relatively large, inflow resistance of the air to the bag-like member 19 is relatively small.

The solenoid valve 27 in conjunction with the controller 10 for performing the opening and closing control thereon constitutes compressed state maintaining means and inflation control means in the present invention.

Subsequently, in the present embodiment, a basic motion control of the leg 3 for moving the robot 1 is described. Further, a substantial part of this motion control (processing other than that in STEP 6 in FIG. 4) is described in detail in Japanese Patent Laid-Open Publication No. 10-277969, etc. by the present applicant, and hence, only a summary is described herein.

Figure 4:
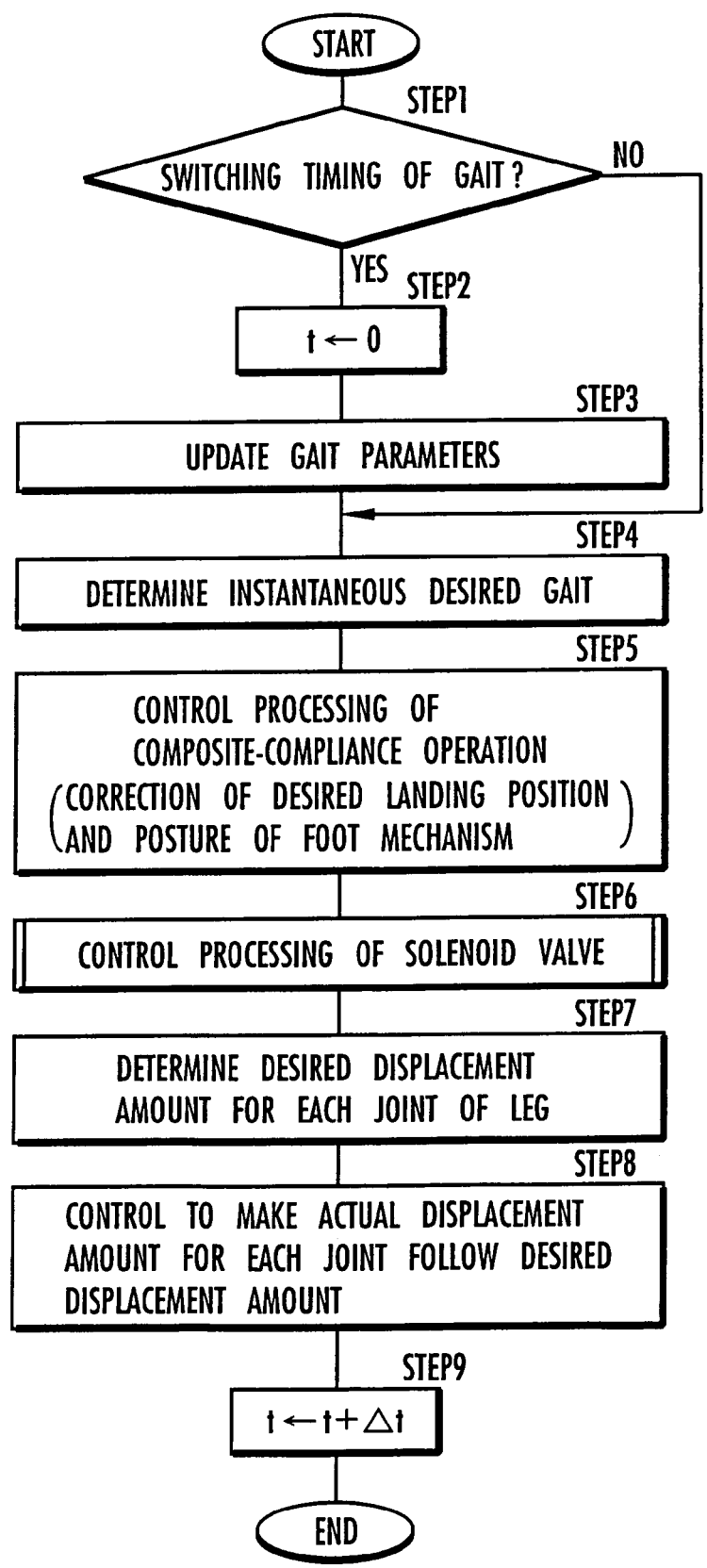
FIG. 4 is a flowchart showing processing for a motion control of the legged mobile robot of FIG. 1.

The controller 10 equipped on the upper body 2 of the robot 1 executes processing shown in a flowchart of FIG. 4 by a predetermined control cycle. In other words, the controller 10 first judges whether or not switching timing is presented for a gait (a walking pattern of the leg 3) of the robot 1 (STEP 1). Here, the switching timing of the gait is switching timing of a supporting leg, and timing when the leg 3 on the free leg side lands on the floor (when the bag-like member 19 of the foot mechanism 6 of the leg 3 makes contact with the ground in the present embodiment) for example. The judgment for this timing is made based on output of the six-axis force sensor 15 or the like for example.

When the switching timing for the gait is presented in STEP 1, after initializing control processing time t to "0" (STEP 2), the controller 10 updates a gait parameter (STEP 3) based on a motion command of the robot 1 externally given and a predetermined movement plan of the robot 1 (a plan prescribed what timing is taken and how the robot 1 is moved, etc.). Here, the gait parameter is a parameter for defining a desired gait for one walking step of the robot 1 and for example, it is a parameter for movement modes of walking, running, and the like, length of a step while the robot 1 is moving, a moving speed (walking cycle), or the like. In addition, the desired gait of the robot 1 is constructed of a desired position and a trajectory of a posture of the upper body 2, a desired position and a trajectory of a posture of the foot mechanism 6 of each leg 3, a desired total floor reaction force (a desired value for a resultant force of a floor reaction force each acting on both the legs 3, 3), a trajectory of a desired ZMP (a desired position of an acting point for the total floor reaction force), and the like. Further, the desired ZMP is more specifically a desired position of an acting point for a total floor reaction force to dynamically counterpoise with a resultant force of an inertia force and gravity acting on the robot 1 depending on a desired motion pattern of the robot 1 defined according to the desired position and the trajectory of the posture of the upper body 2 as well as the desired position and the trajectory of the posture of the foot mechanism 6 of each leg 3 (a total floor reaction force on the same line of action with the resultant force), and a desired position for a point on the floor in such a way that moments (a moment about an axis of a horizontal direction) except a moment about an axis of a vertical direction for the total floor reaction force become "0" (Zero Moment Point).

After setting a new gait parameter in STEP 3 as described above or when it is not the switching timing of the gait in the above-mentioned STEP 1, the controller 10 executes processing of STEP 4 and determines an instantaneous desired gait as a desired gait in a current control cycle based on a currently set gait parameter. That is to say, among the desired gaits for one walking step of the robot 1 defined by the currently set gait parameters, the desired gaits (the desired position and the posture of the upper body 2 at a current time t, the desired position and the posture of each foot mechanism 6, the desired total floor reaction force, and the desired ZMP) in the current control cycle (current time t) are determined as the instantaneous desired gaits.

Subsequently, the controller 10 executes control processing for a composite-compliance operation in STEP 5, and corrects the desired position and the posture of each foot mechanism 6 in the instantaneous desired gaits determined in STEP 4. In this processing for the composite-compliance operation, a moment component of the total floor reaction force (hereinafter referred to as a compensating total floor reaction force's moment) to be generated around the desired ZMP (an acting point of the desired total floor reaction force) to restore the upper body 2 into the desired posture depending on a deviation between the desired posture of the upper body 2 (the desired inclination angle) and an actual inclination angle of the upper body 2 detected according to an output such as a gyro sensor, an acceleration sensor or the like which is not shown is determined. At this point, the compensating total floor reaction force's moment to be determined is a moment about an axis of a horizontal direction, and consists of a moment component about an axis of a forward/backward direction of the robot 1 and a moment component about an axis of a right/left direction. The controller 10 then corrects the desired position and the posture of each foot mechanism 6 such that a resultant force of the actual floor reaction forces (the actual total floor reaction force) for each leg 3 detected by the six-axis force sensor 15 of each leg 3 follows a resultant force between the above compensating total floor reaction force's moment and the desired total floor reaction force within a range that a ground contacting property of the foot mechanism 6 in a landing state can be secured. In this case, in the aforementioned desired ZMP as the acting point of the desired floor reaction force, the moment component about the axis of the horizontal direction (the forward/backward direction and the right/left direction) for the desired total floor reaction force is "0". Accordingly, the corrections of the desired position and the posture of each foot mechanism 6 are performed to allow the moment component about the axis of the horizontal direction for an actual total floor reaction force to follow the compensating total floor reaction force's moment. Further, in such corrections of the desired position and the posture of each foot mechanism 6, the desired position and the posture of each foot mechanism 6 is corrected so as to compensate influences of elastic deformations of the elastic member 16 and the ground-contacting members 17 during the ground contact of each foot mechanism 6.

Subsequently, the controller 10 executes control processing of the solenoid valve 27 (STEP 6). This control processing is described later.

Subsequently, desired displacement amounts of respective joints 7 through 9 of the two legs 3, 3 (more specifically, desired rotational angles about each axis of respective joints 7 through 9) are determined (STEP 7) by kinematics arithmetic processing based on geometric models of the robot 1 (rigid link models) according to the desired position and the posture of the upper body 2 of the instantaneous desired gaits determined in the aforementioned STEP 4 and the desired position and the posture of each foot mechanism 6 corrected in STEP 5. The controller 10 then controls torque of an electric motor (not shown) driving the respective joints 7 through 9 so as to allow actual displacement amounts of the respective joints 7 through 9 to follow the determined desired displacement amount (STEP 8). Further, in this situation, the actual displacement amounts of the respective joints 7 through 9 (actual rotational angles about each axis of respective joints 7 through 9) are detected by rotary encoders or the like equipped in the respective joints 7 through 9. Moreover, the controller 10 increases a control processing time t by a predetermined time Δt (time equivalent to a period of a control cycle) (STEP 9) to complete the processing of FIG. 4.

According to the control processing of the controller 10 as has been described, the robot 1 will move in such a way as to follow the desired gaits while autonomously securing stability of its posture.

Figure 5:
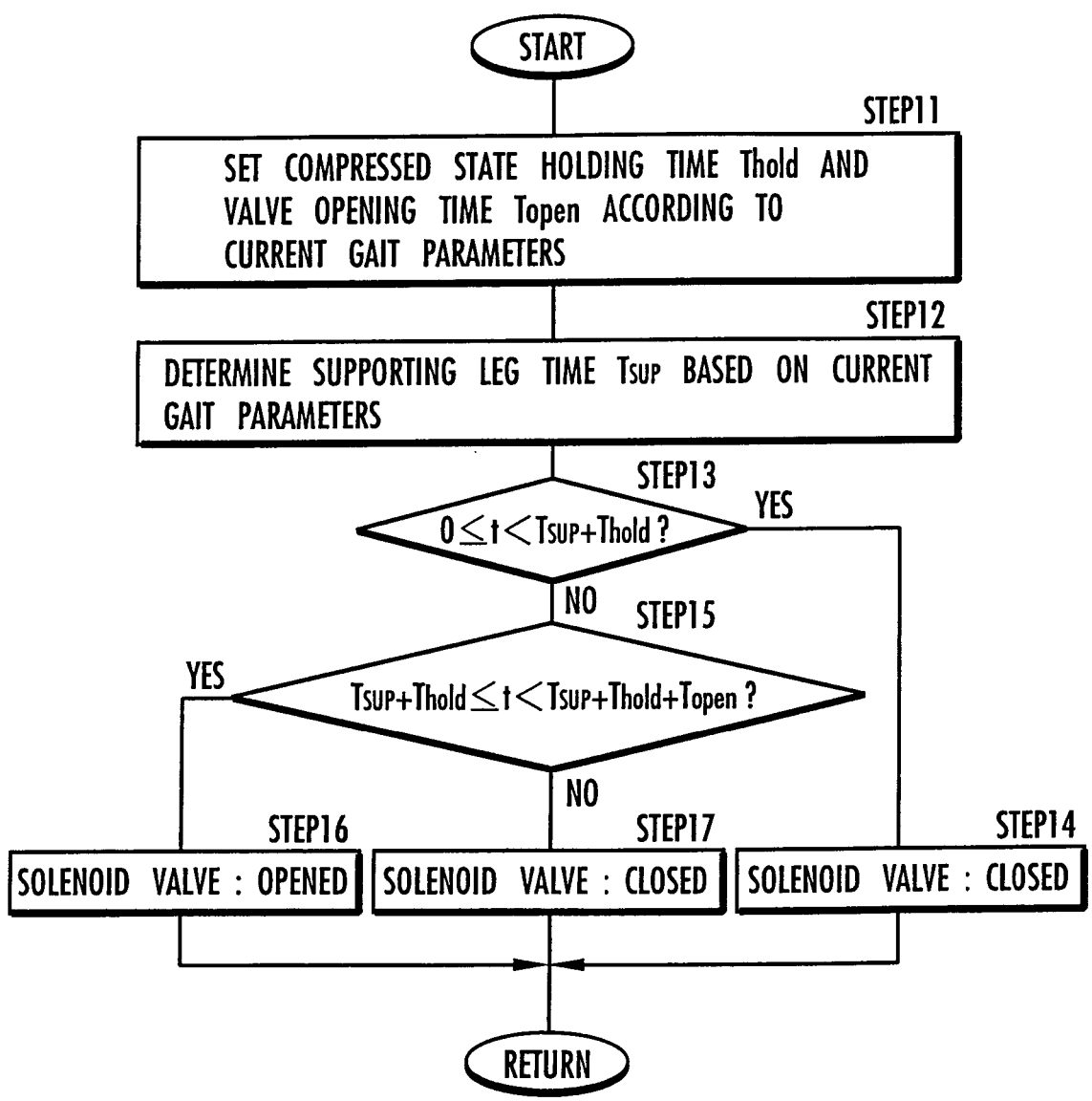
FIG. 5 is a flowchart for explaining an operation of the landing shock absorbing device of the foot mechanism in FIG. 2.

On the other hand, in the aforementioned STEP 6, the controller 10 controls the solenoid valve 27 provided corresponding to the relevant leg 3 for each leg 3, as shown in a flowchart in FIG. 5.

According to the currently set gait parameters (the movement mode, length of step, movement speed of the robot 1 and the like), the controller 10 first sets compressed state holding time Thold which defines time (a period) when the bag-like member 19 is maintained in the compressed state immediately after the leg 3 shifts from the landing state to the lifting state, and valve opening time Topen which defines time (a period) when the solenoid valve 27 is controlled for opening after releasing the maintenance of the compressed state (STEP 11). In this case, basically, as the movement speed of the robot 1 is higher, the compressed state holding time Thold is set at shorter time. Furthermore, basically, as the movement speed of the robot 1 is increased, the valve opening time Topen is set at longer time. However, a sum of these compressed state holding time Thold and the valve opening time Topen is shorter than time when the leg 3 is maintained in the lifting state.

Furthermore, the controller 10 determines time Tsup when the leg 3 is in a supporting leg stage (time when the foot mechanism 6 is maintained in the state that the foot mechanism 6 is in contact with the ground through the ground-contacting members 17 or the bag-like member 19. Hereinafter, this is referred to as supporting leg time Tsup) based on the currently set gait parameters (STEP 12).

Subsequently, the controller 10 judges whether or not the current time t (elapsed time from a switching point of the gait) is in a period of $0 \leq t < Tsup+Thold$, that is, whether or not it is in a period from a time when the bag-like member 19 of the foot mechanism 6 of the leg 3 almost starts to make contact with the ground (a start time of the supporting leg stage) until the compressed state holding time Thold elapses after the supporting leg stage of the leg 3 ends (STEP 13). At this time, when $0 \leq t < Tsup+Thold$ is satisfied, the controller 10 controls the solenoid valve 27 for closing (STEP 14).

On the other hand, in STEP 13, when $0 \leq t < Tsup+Thold$ is not satisfied, that is, in the state after the compressed state holding time Thold further elapses after the supporting leg stage of the leg 3 ends, the controller 10 judges whether or not the current time t satisfies $Tsup+Thold \leq t < Tsup+Thold+Topen$ (STEP 15). At this time, when $Tsup+Thold \leq t < Tsup+Thold+Topen$ is satisfied, the controller 10 controls the solenoid valve 27 for opening (STEP16). Furthermore, when $Tsup+Thold \leq t < Tsup+Thold+Topen$ is not satisfied (in this case, basically, in the state little before the bag-like member 19 of the leg 3 again makes contact with the ground by the landing motion of the leg 3 in the lifting state), the controller 10 controls the solenoid valve 27 for closing (STEP 17).

Figure 6:
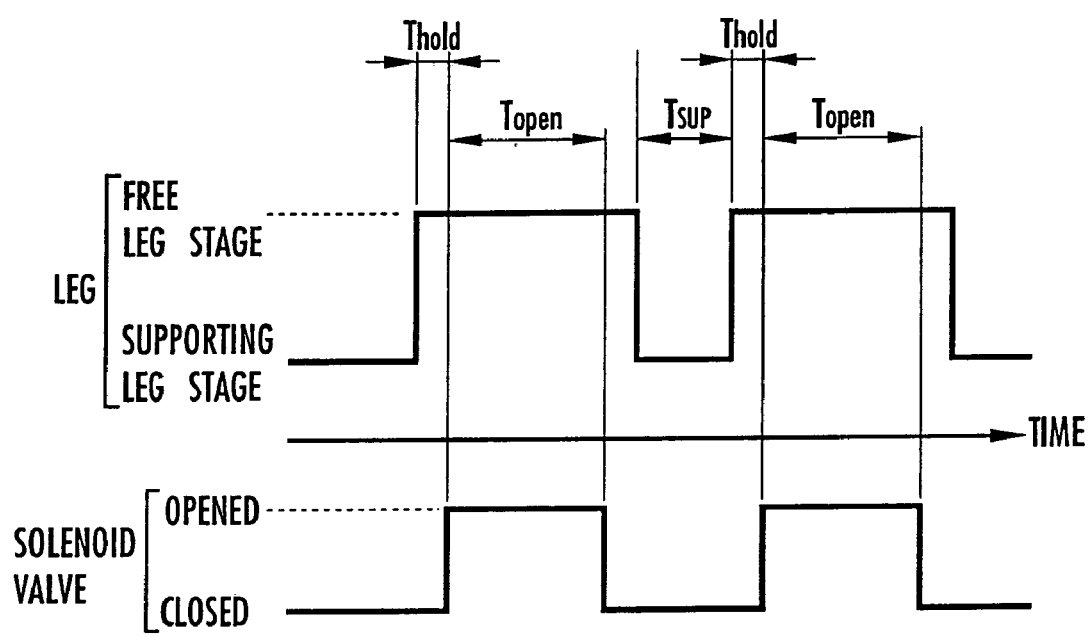
FIG. 6 is a timing chart for explaining the operation of the landing shock absorbing device of the foot mechanism in FIG. 2.

By the above-described control of the solenoid valve 27, as shown in a timing chart in FIG. 6, the solenoid valve 27 is held closed in the period from the start time of the supporting leg stage of the leg 3 until the compressed state holding time Thold elapses after the supporting leg stage ends, including all the time of the supporting leg stage. Accordingly, in this state, air in the atmosphere cannot flow into the bag-like member 19. Furthermore, in a free leg stage of the leg 3 (in a state that the entire foot mechanism 6 including the bag-like member 19 is estranged from the floor A), the solenoid valve 27 is held opened for the valve opening time Topen. In this state, the air in the atmosphere can flow into the bag-like member 19 through the fluid conduit 24.

Subsequently, an operation and an advantage of the landing shock absorbing device 18 is described. During the movement of the robot 1 by the aforementioned control processing of the controller 10, first the bag-like member 19 makes contact with the ground when the leg 3 on the free leg side (the leg 3 in the lifting state) is landing. The bag-like member 19 is compressed by a floor reaction force acting on the bag-like member 19 with a progress of the landing motion of the leg 3.

At this moment, as the bag-like member 19 is compressed, the air in the bag-like member 19 is compressed and pressurized to be flowed out through the flow hole 21 and the fluid conduit 23. At this time, outflow resistance of the air is generated in the flow hole 21. Accordingly, motion energy of the leg 3 is damped. Additionally, in this situation, a part of the motion energy of the leg 3 is converted into and absorbed by elastic energy of the air according to spring property of the air as compressible fluid. Furthermore, the elastic energy is dispersed by the outflow resistance of the air from the bag-like member 19. Accordingly, while avoiding instantaneous rapid changes of the floor reaction force acting on the leg 3 through the bag-like member 19, an impact load (a landing shock) in the landing motion of the leg 3 is reduced. In this situation, the bag-like member 19 is deformable and is deformed along a shape of the floor A to be compressed, so that the landing shock may be reduced without suffering from so much influence by the shape of the floor A and the posture of the foot mechanism 6 immediately before landing, and the bag-like member 19 is also less prone to damage and the like.

The bag-like member 19 is compressed until the state that the foot mechanism 6 makes contact with the ground through the front and rear ground-contacting members 17 (the state that the landing motion of the leg 3 is completed).

Subsequently, although the bag-like member 19 attempts to inflate by its own shape restoring force by the lifting motion of the leg 3, the solenoid valve 27 is held closed until the compressed state holding time Thold elapses after the supporting leg stage of the leg 3 ends, as described above. Therefore, not only in the state that the foot mechanism 6 is in contact with the ground through the ground-contacting members 17 immediately after the lifting motion of the leg 3 starts but also in the period from the time when the ground-contacting members 17 are estranged from the floor A until the compressed state holding time Thold elapses, air in the atmosphere cannot flow into the bag-like member 19. Accordingly, the bag-like member 19 does not inflate until the compressed state holding time Thold elapses after the foot mechanism 6 shifts from the landing state to the lifting state.

In addition, after the foot mechanism 6 is completely estranged from the floor A and the compressed state holding time Thold elapses, the solenoid valve 27 is held opened for the valve opening time Topen. At this time, the bag-like member 19 is inflating by its own restoring force to the natural state, while air in the atmosphere flows into the bag-like member 19 through the fluid conduit 24. In this case, the valve opening time Topen is set at shorter time than time required to inflate the bag-like member 19 to the natural state. Accordingly, the height of the bag-like member 19 in the inflated state when the valve opening time Topen elapses depends on the valve opening time Topen. Thus, in the state that the bag-like member 19 inflates, the landing motion of the leg 3 is performed again, and the landing shock is reduced in the landing motion as described above.

By the operation of the landing shock absorbing device 18 of the present embodiment as explained above, the landing shock in the landing motion of each leg 3 can be reduced. In this case, according to the present embodiment, in the landing state of the leg 3, air does not flow into the bag-like member 19, so that the bag-like member 19 does not inflate. Therefore, the floor reaction force is not allowed to act on the portion of the bag-like member 19, but the floor reaction force is allowed to intensively act on a desired part of the foot mechanism 6 by the posture control in the landing state of the foot mechanism 6. For example, when the robot 1 is about to fall forward, the floor reaction force can be concentrated on the front end side of the foot mechanism 6. As a result, the posture stabilization of the robot 1 can be achieved easily. For supplemental description regarding this, if the solenoid valve 27 is maintained opened in the landing state of the leg 3, air in the atmosphere attempts to flow into the bag-like member 19 (because the bag-like member 19 constantly attempts to inflate), so that the floor reaction force constantly acts on the portion of the bag-like member 19. Therefore, the floor reaction force cannot be concentrated on a desired part of the foot mechanism 6, and the posture stabilization of the robot 1 by posture control in the landing state of the foot mechanism 6 is apt to be limited. In contrast, in the landing shock absorbing device 18 of the present embodiment, the limit of the posture stabilization of the robot 1 can be raised as described above.

Furthermore, since the bag-like member 19 is maintained in the compressed state until immediately after the leg 3 shifts from the landing state to the lifting state, when the foot mechanism 6 of the leg 3 is estranged from the floor A, the bag-like member 19 does not inflate to make contact with the floor A. As a result, the lifting motion of the leg 3 can be performed smoothly without causing stumbling in the lifting motion of the leg 3. In this case, since the time when the bag-like member 19 is maintained in the compressed state immediately after the leg 3 shifts to the lifting state, that is, the compressed state holding time Thold is shorter as the movement speed of the robot 1 is faster, it can be maintained to minimum time required. Thereafter, time for inflating the bag-like member 19 can be secured sufficiently.

Furthermore, according to the present embodiment, an upper limit of the height of the bag-like member 19 when the bag-like member 19 inflates in the lifting state of the leg 3, that is, the height of the bag-like member 19 immediately before the landing motion of the leg 3 (this is a size of the bag-like member 19 in a compression direction) is defined by the valve opening time Topen (the time when air is made to flow into the bag-like member 19). In addition, this valve opening time Topen is set according to the gait parameters, and basically, it is set at longer time as the movement speed of the robot 1 is faster. Therefore, as the movement speed of the robot 1 is faster, the height of the bag-like member 19 immediately before the landing motion of the leg 3 is larger. Accordingly, as the movement speed of the robot 1 is faster, a compression amount of the bag-like member 19 in the landing motion of the leg 3 is larger. As a result, the reduction effect of the landing shock by the landing shock absorbing device 18 can be suitable for the gait type of the robot 1, and the landing shock can be smoothly reduced regardless of the gait type of the robot 1.

Additionally, the landing shock absorbing device 18 of the present embodiment may bring the following effects. In other words, fluid that flows into and out of the bag-like member 19 is the air as the compressible fluid, and hence the landing shock absorbing device 18 may be configured to be lightweight. Furthermore, during the landing motion of the leg 3, the pressure inside of the bag-like member 19 is increased with certain degree of a time constant and not increased instantaneously, so that the rapid change in the floor reaction force may be avoided. In addition, the air flowing out of the bag-like member 19 when the bag-like member 19 is compressed is released into the atmosphere and new air flows into the bag-like member 19 from the atmosphere when the bag-like member 19 is inflated, and resultingly, heat generated with outflow resistance of the air from the bag-like member 19 will not be stored in the bag-like member 19. In other words, the landing shock absorbing device 18 has a good heat dissipation property, so that a heat managing instrument such as an radiator does not need to be provided.

Additionally, the spring constant of the air in the bag-like member 19 functioning as a spring during the landing motion of the leg 3 becomes small with the compression immediately after the bag-like member 19 makes contact with the ground, and hence an effect of control of the aforementioned composite-compliance operation may be enhanced. That is to say, in the control of the composite-compliance operation of the robot 1, as described above, the position and the posture of each foot mechanism 6 are corrected so as to allow the moment component about the axis of the horizontal direction for the actual total floor reaction force (hereinafter referred to as an actual total floor reaction force's moment) to follow the compensating total floor reaction force's moment (also including an occasion that the compensating total floor reaction force's moment is "0") as a desired value of the moment component. Such a composite-compliance operation control is for making the landing position and the posture of the foot mechanism 6 adjust to the floor A to secure the stability of the posture of the robot 1, even when the floor A has an inclination. In this situation, in order to enhance a following-property of the actual total floor reaction force's moment to the compensating total floor reaction force's moment, it is preferable that a compliance gain in the composite-compliance operation control, that is, a change amount of the desired landing position and the posture of the foot mechanism 6 to a change of the deviation between the actual total floor reaction force's moment and the compensating total floor reaction force's moment (a change amount of the rotational angle of the ankle joint 9) is increased. However, when the above compliance gain is taken to be big, in general, a loop gain of the composite-compliance operation control (generally, this is proportional to the product of the above compliance gain and the total spring constant of the spring mechanism which the foot mechanism 6 has (the ground-contacting members 17, the elastic member 16, and the landing shock absorbing device 18)) becomes big, and resultantly, a control system tends to be unstable.

However, the spring constant of the air in the bag-like member 19 of the landing shock absorbing device 18 of the present embodiment becomes small with the compression immediately after the bag-like member 19 makes contact with the ground, and hence the above loop gain becomes small. As a result, even when the compliance gain is increased, the stability of the composite-compliance operation control may be secured. Consequently, the following-property of the actual total floor reaction force's moment to the compensating total floor reaction force's moment may be improved and furthermore, the securement of the stability of the posture of the robot 1 may be improved.

Figure 7:
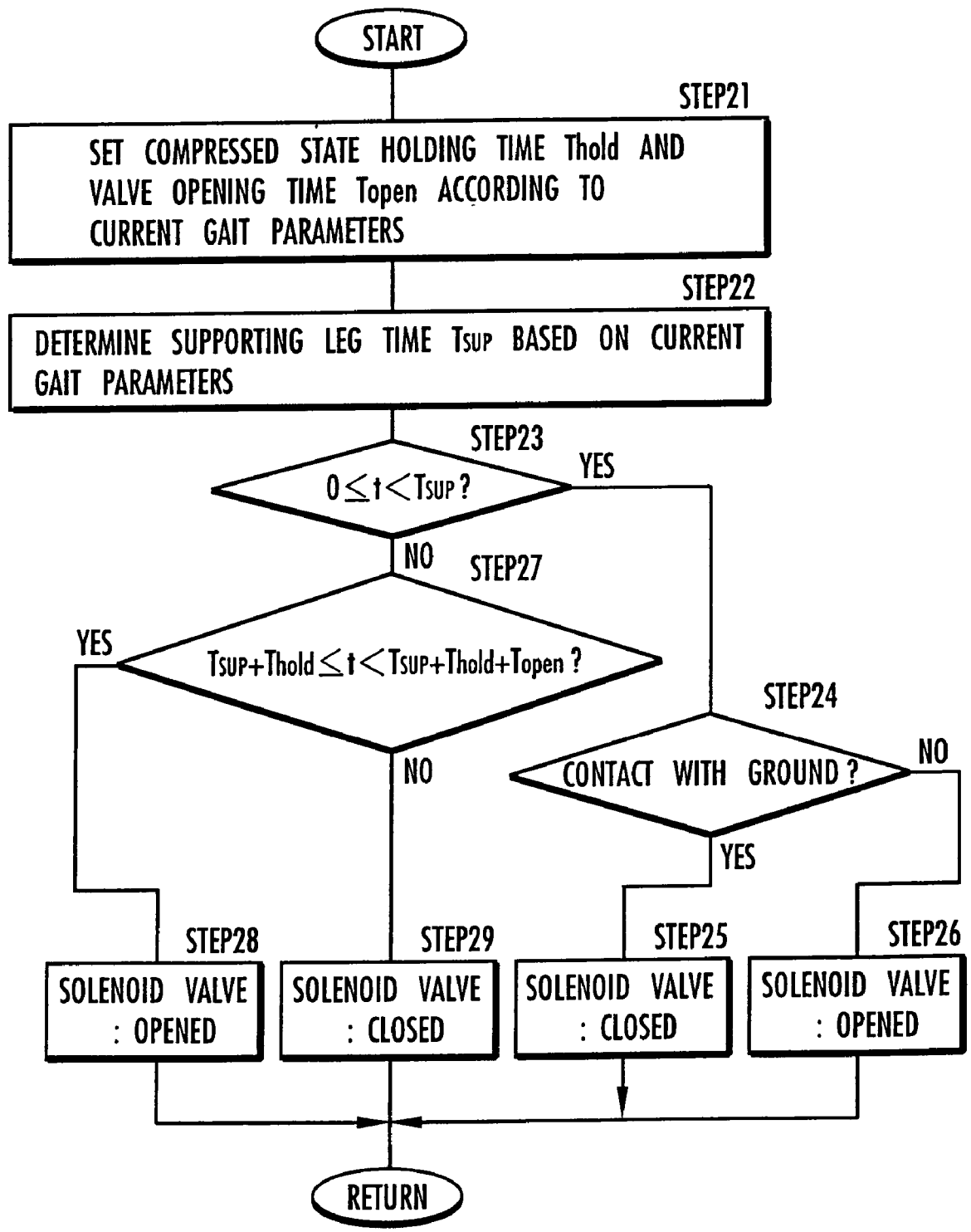
FIG. 7 is a flowchart for explaining an operation of a landing shock absorbing device of a second embodiment of the present invention.

Subsequently, referring to FIG. 7, a second embodiment of the present invention is described. FIG. 7 is a flowchart for explaining an operation of a substantial part of the present embodiment. Further, the present embodiment differs from the first embodiment only in a part of control processing of the solenoid valve 27, so that the reference numerals identical to those of the first embodiment are used. Descriptions about component portions identical to those of the first embodiment are omitted.

According to the first embodiment, the opening and closing timing of the solenoid valve 27 is determined based on time information only. However, when actual ground-contacting timing in the landing motion of the leg 3 of the robot 1 (timing at which the bag-like member 19 of the foot mechanism 6 makes contact with the ground) falls behind a scheduled time, the controller 10 positively lets down the foot mechanism 6 to rapidly land the leg 3 on the floor. This is apt to cause a larger landing shock than usual in the landing motion of the foot mechanism 6.

The present embodiment is intended to address such a situation, and the controller 10 controls the solenoid valve 27 in STEP 6 of FIG. 4 as shown in the flowchart of FIG. 7. That is to say, according to the present embodiment, in STEPs 21 and 22, the controller 10 executes the same processing as that in STEPs 11 and 12 of FIG. 5 according to the first embodiment, and then in STEP 23, the controller 10 judges whether or not the current time t satisfies $0 \leq t < Tsup$, that is, whether or not the current time t is within the supporting leg stage of the leg 3. At this time, in the case of $0 \leq t < Tsup$, the controller 10 further judges whether or not the foot mechanism 6 of the leg 3 is actually in contact with the ground through the ground-contacting members 17 or the bag-like member 19 (STEP 24). This judgment is made based on output of the six-axis force sensor 15, for example. In addition, in STEP 24, when the foot mechanism 6 is in contact with the ground, the solenoid valve 27 is controlled for closing (STEP 25). Alternatively, in STEP 24, when the foot mechanism 6 is not in contact with the ground, the solenoid valve 27 is controlled for opening (STEP 26).

Furthermore, when the current time t does not satisfy $0 \leq t < Tsup$ in STEP 23, the controller 10 then executes the same judgment processing as that in STEP 15 of the FIG. 5 according to the first embodiment, that is, whether or not the current time t satisfies $Tsup+Thold \leq t < Tsup+Thold+Topen$ in STEP 27. Then, according to this judgment result, in STEP 28 or 29, the opening and closing control of the solenoid valve 27 is executed as in the first embodiment. In this case, according to the present embodiment, a state that $Tsup+Thold \leq t < Tsup+Thold+Topen$ is not satisfied in STEP 27 includes a state of $Tsup \leq t < Tsup+Thold$. Accordingly, in the state of $Tsup \leq t < Tsup+Thold$, in STEP 29, the solenoid valve 27 is controlled for closing as in the first embodiment.

By the aforementioned opening and closing control of the solenoid valve 27, when the foot mechanism 6 is in contact with the ground through the ground-contacting members 17 or the bag-like member 19 in the supporting leg stage of the leg 3, that is, when the lifting/landing motions of the leg 3 are being performed as scheduled according to a desired gait, the opening and closing control of the solenoid valve 27 is performed completely similar to the first embodiment. Accordingly, in this case, an operation and an effect by the landing shock absorbing device 18 of the present embodiment are the same as those of the first embodiment.

On the other hand, when the foot mechanism 6 is not in contact with the ground through the ground-contacting members 17 or the bag-like member 19 in the supporting leg stage ($0 \leq t < Tsup$), that is, for example, in such an occasion that the bag-like member 19 is not in contact with the ground at the time when the bag-like member 19 of the leg 3 should have made contact with the ground in the landing motion of the leg 3, the solenoid valve 27 is controlled for opening. In this case, the solenoid valve 27 is not necessarily required to be completely opened, and it may be controlled for half-opening, for example.

In this manner, since the solenoid valve 27 is controlled for opening, the bag-like member 19 resumes the inflation that has been ceased by closing the solenoid valve 27 when the valve opening time Topen elapses in the lifting state of the leg 3, so that air flows into the bag-like member 19 to thereby increase the height of the bag-like member 19. As a result, even when the foot mechanism 6 is lowered in order to rapidly bring the foot mechanism 6 of the leg 3 into contact with the ground, the landing shock of the leg 3 can be reliably reduced.

Figure 8:
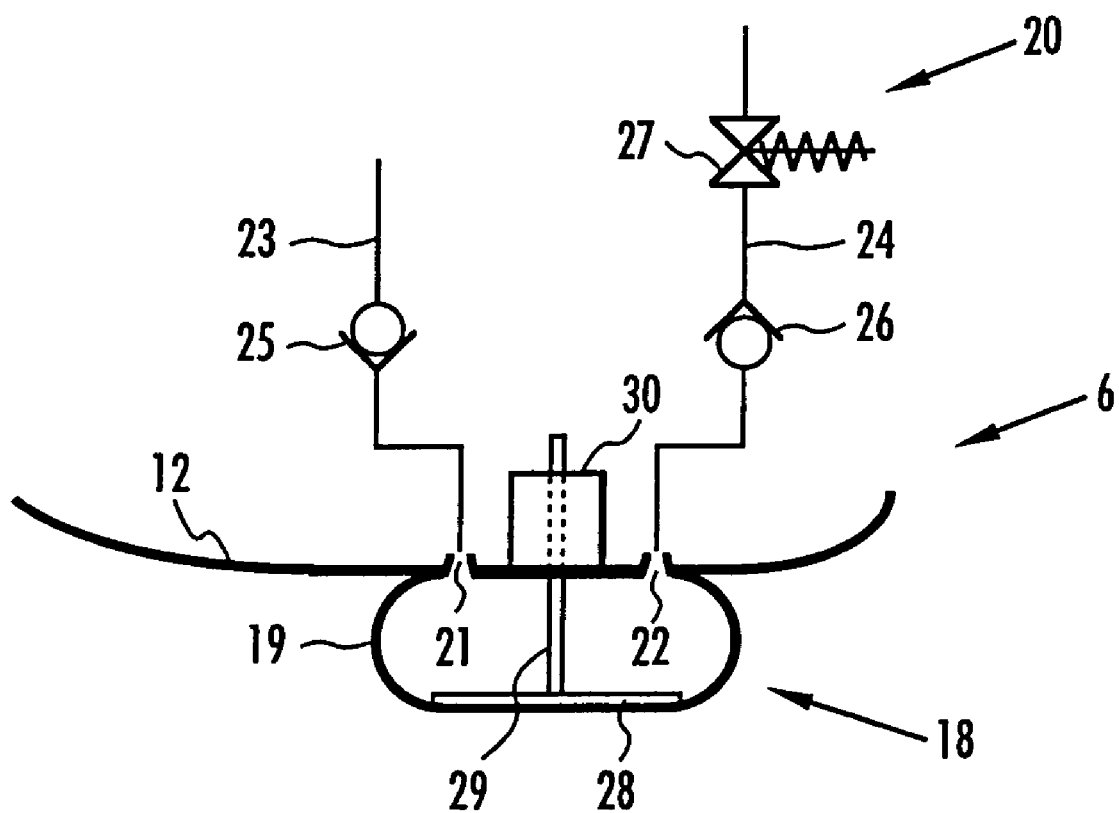
FIG. 8 is an exemplary view of a substantial part of a foot mechanism provided with a landing shock absorbing device of a third embodiment of the present invention.
Figure 9:
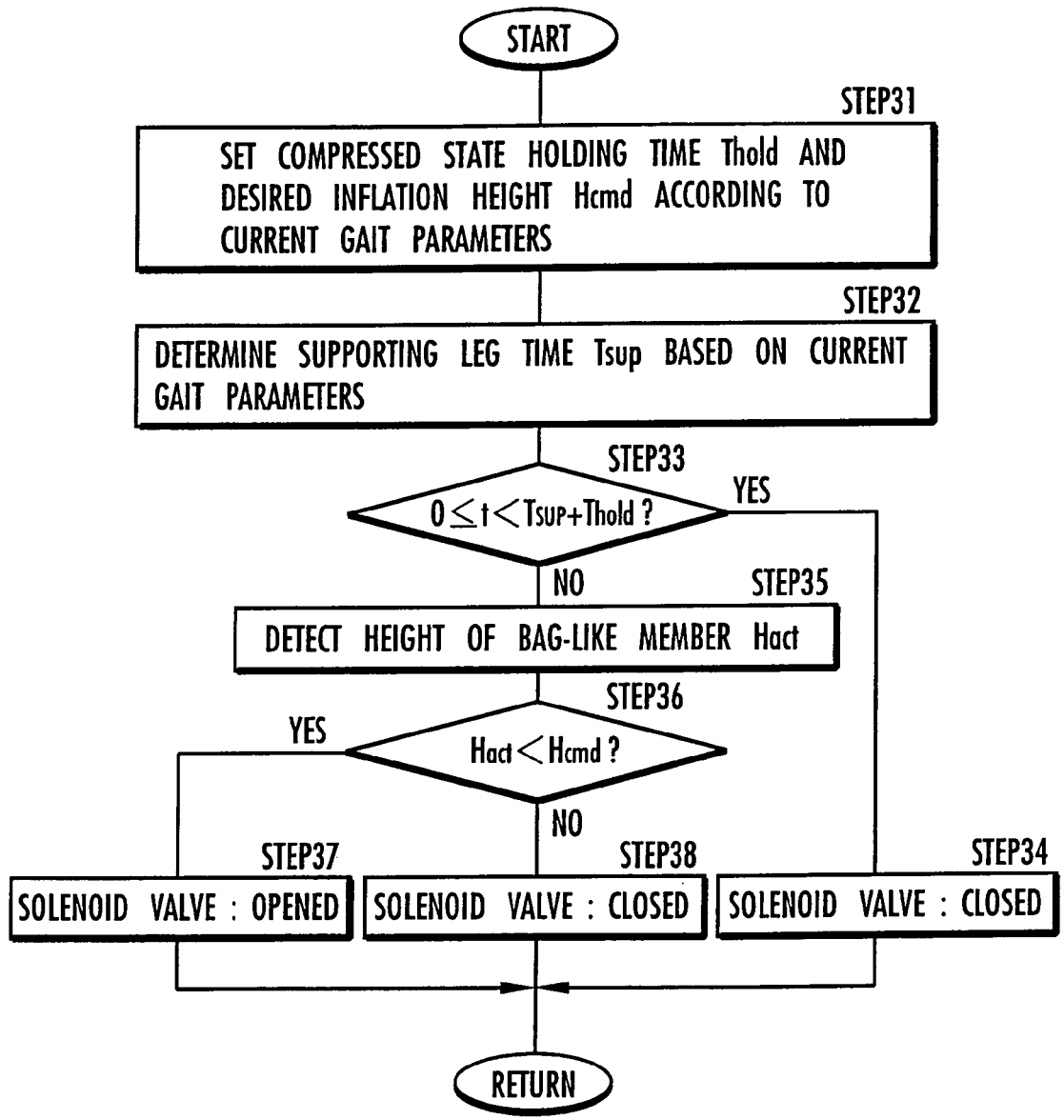
FIG. 9 is a flowchart for explaining an operation of the landing shock absorbing device of the third embodiment of the present invention.

Subsequently, a third embodiment of the present invention is described referring to FIGS. 8 and 9. FIG. 8 is an exemplary view of a substantial part of a foot mechanism provided with a landing shock absorbing device of the present embodiment, and FIG. 9 is a flowchart for explaining an operation of the substantial part of the present embodiment. According to the present embodiment, the foot mechanism is the same as that of the first embodiment except for a configuration relating to the landing shock absorbing device, and only a substantial configuration of the foot mechanism is illustrated in FIG. 8. Furthermore, in the descriptions of the present embodiment, for the same component portions or the same functional portions as those of the first embodiment, the reference numerals identical to those of the first embodiment are used, and descriptions are omitted.

Referring to FIG. 8, according to the present embodiment, a plate member 28 is fixedly provided at a bottom face portion inside of the bag-like member 19 attached to a bottom face of the foot plate member 12, and a rod member 29 extended upward from this plate member 28 slidably penetrates the foot plate member 12 in the vertical direction (the compression direction of the bag-like member 19) to project to an upper side of the foot plate member 12. Accordingly, a length of the projecting portion of the rod member 29 (hereinafter, referred to as a projection amount) becomes larger as the bag-like member 19 is compressed, depending on the height of the bag-like member 19. In addition, on the projection portion of the rod member 29, there is loaded a linear potentiometer 30 as a sensor for detecting the projection amount and thus the height of the bag-like member 19 (the size of the bag-like member 19 in the compression direction), and an output signal of this linear potentiometer 30 is input to the controller 10 so that the opening and closing control of the solenoid valve 27 of the inflow/outflow means 20 having the same configuration as that of the first embodiment is performed by the controller 10. Configurations other than the foregoing (including the control processing of the controller 10 other than the opening and closing control of the solenoid valve 27) are the same as those of the first embodiment.

Furthermore, according to the present embodiment, in STEP 6 of FIG. 4, the controller 10 controls the solenoid valve 27 as shown in the flowchart of FIG. 9. That is to say, the controller 10 first sets the compressed state holding time Thold described in the first embodiment and a desired value of an upper limit height Hcmd of the bag-like member 19 when inflating the bag-like member 19 in the lifting state of the leg 3 (hereinafter, referred to as a desired inflation height Hcmd), according to the currently set gait parameters (the movement mode, length of step, movement speed of the robot 1, etc.) (STEP 31). In this case, the way to set the compressed state holding time Thold is the same as that of the first embodiment. Furthermore, basically, the desired inflation height Hcmd is set at a larger value as the movement speed of the robot 1 is higher. However, according to the present embodiment, the desired inflation height Hcmd is a height equal to or less than a height in the natural state of the bag-like member 19.

Furthermore, the controller 10 determines the supporting leg time Tsup when the leg 3 is in the supporting leg stage based on the currently set gait parameters as in STEP 12 of FIG. 5 in the first embodiment (STEP32).

Subsequently, the controller 10 judges whether or not the current time t (the elapsed time from the switching point of the gait) is within the period of $0 \leq t < Tsup+Thold$ (STEP 33). At this time, in the case of $0 \leq t < Tsup+Thold$, the controller 10 controls the solenoid valve 27 for closing (STEP 34). The processing in STEPs 33 and 34 is the same as that in STEPs 13 and 14 in FIG. 5 of the first embodiment.

On the other hand, in STEP 33, when $0 \leq t < Tsup+Thold$ is not satisfied, the controller 10 further detects an actual height Hact of the bag-like member 19 in the current bag-like member 19 by the output of the linear potentiometer 30 (STEP 35) to compare this detected height Hact with the aforementioned desired inflation height Hcmd (STEP 36). In addition, in the case of Hact<Hcmd, the controller 10 controls the solenoid valve 27 for opening (STEP 37), and in the case of Hact≧Hcmd, the controller 10 controls the solenoid valve 27 for closing (STEP 38).

By the above-described closing and opening control of the solenoid valve 27, the bag-like member 19 is maintained in the compressed state, in the landing state of the leg 3 and immediately after shifting from the landing state to the lifting state, which is completely similar to the first embodiment.

On the other hand, according to the present embodiment, during the inflation of the bag-like member 19 after opening the solenoid valve 27 in the lifting state of the leg 3, when the actual height Hact of the bag-like member 19 becomes the desired inflation height Hcmd set according to the gait parameters, the solenoid valve 27 is controlled for closing to block off the inflow of air into the bag-like member 19. As a result, the height of the bag-like member 19 before landing of the robot 1 is controlled to be the desired inflation height Hcmd. Accordingly, similar to the first embodiment, a reduction effect of the landing shock by the landing shock absorbing device 18 can be suitable for the gait type of the robot 1, and the landing shock can be smoothly reduced regardless of the gait type of the robot 1. In addition, in this case, since the height of the bag-like member 19 is reliably controlled to be the desired inflation height Hcmd according to the gait type of the robot 1, the reduction effect of the landing shock can be advantageously secured.

Figure 10:
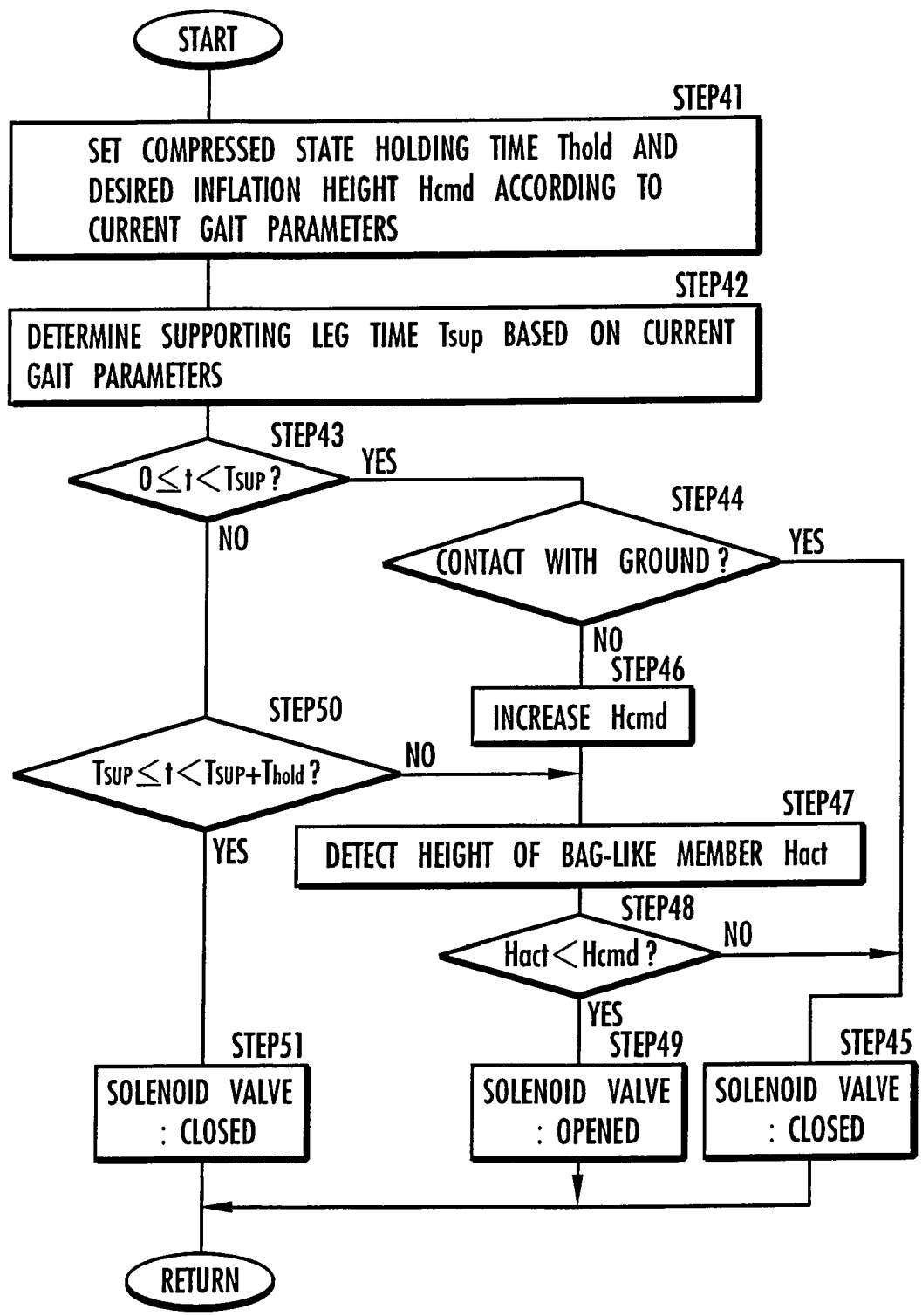
FIG. 10 is a flowchart for explaining an operation of a landing shock absorbing device of a fourth embodiment of the present invention.

Subsequently, a fourth embodiment of the present invention is described referring to FIG. 10. FIG. 10 is a flowchart for explaining an operation of a substantial part of the present embodiment. Since the present embodiment differs from the third embodiment only in a part of the control processing of the solenoid valve 27, reference numerals identical to those of the first embodiment are used. In addition, descriptions of component portions identical to those of the third embodiment are omitted.

According to the present embodiment, similar to the second embodiment, an occasion where the foot mechanism 6 of the leg 3 makes contact with the ground behind the scheduled time is considered. The controller 10 controls the solenoid valve 27 in STEP 6 of the FIG. 4 as shown in the flowchart of FIG. 10. That is to say, in STEPs 41 and 42, the controller 10 executes the same processing as the processing in STEPs 31 and 32 of FIG. 9 in the third embodiment, and then in STEP 43, the controller 10 judges whether or not the current time t satisfies $0 \leq t < Tsup$, that is, whether or not the current time t is within the supporting leg stage of the leg 3. At this time, in the case of $0 \leq t < Tsup$, the controller 10 further judges whether or not the foot mechanism 6 of the leg 3 is actually in contact with the ground through the ground-contacting members 17 or the bag-like member 19 thereof (STEP 44). This judgment is made based on the output of the six-axis force sensor 15, for example. In addition, in this STEP 44, when the foot mechanism 6 is in contact with the ground, the solenoid valve 27 is controlled for closing (STEP 45).

When the foot mechanism 6 is not in contact with the ground in STEP 44, the controller 10 increases the currently set desired inflation height Hcmd (STEP 46). In this case, an increase amount of the desired inflation height Hcmd is, for example, a predetermined unit increase amount. Furthermore, the controller 10 detects the actual height Hact of the bag-like member 19 for the current bag-like member 19 by the output of the linear potentiometer 30 (STEP 47) to compare this detected height Hact with the desired inflation height Hcmd (STEP 48). Then, in the case of Hact<Hcmd, the controller 10 controls the solenoid valve 27 for opening (STEP 49), and in the case of Hact≧Hcmd, the controller 10 controls the solenoid valve 27 for closing (STEP 45).

On the other hand, in STEP 43, when the current time t does not satisfy $0 \leq t < Tsup$, the controller 10 then judges whether or not the current time t satisfies $Tsup \leq t < Tsup+Thold$ (STEP 50). At this time, in the case of $Tsup \leq t < Tsup+Thold$, the controller 10 controls the solenoid valve 27 for closing (STEP 51). Alternatively, when Tsupst<Tsup+Thold is not satisfied, the controller 10 executes the aforementioned processing from STEP 47 to control the solenoid valve 27 for opening and closing based on the comparison of the actual height Hact and the desired inflation height Hcmd of the bag-like member 19.

By the opening and closing control of the solenoid valve 27 as described above, when the foot mechanism 6 is in contact with the ground through the ground-contacting members 17 or the bag-like member 19 in the supporting leg stage of the leg 3, that is, when the lifting/landing motions of the leg 3 are performed as scheduled according to the desired gait, the opening and closing control of the solenoid valve 27 is performed completely similar to the third embodiment. Accordingly, in this case, an operation and an effect by the landing shock absorbing device 18 of the present embodiment are the same as those the third embodiment.

On the other hand, when the foot mechanism 6 is not in contact with the ground through the ground-contacting members 17 or the bag-like member 19 in the supporting leg stage of the leg 3 ($0 \leq t < Tsup$), that is, for example, when the bag-like member 19 is not in contact with the ground at a time when the bag-like member 19 of the leg 3 should have made contact with the ground in the landing motion of the leg 3, the desired inflation height Hcmd is increased to control the solenoid valve 27 for opening. At this time, the opening of the solenoid valve 27, that is, the inflow of air into the bag-like member 19 is performed until the actual height of the bag-like member 19 becomes the increased desired inflation height Hcmd. This inflates the bag-like member 19 so that the height of the bag-like member 19 becomes larger than the height according to the original gait type. However, according to the present embodiment, since the air flowing into the bag-like member 19 is air in the atmosphere, the upper limit of the height of the bag-like member 19 during inflation is the height in the natural state of the bag-like member 19.

In this manner, when the bag-like member 19 of the leg 3 is not in contact with the ground at the time when the bag-like member 19 of the leg 3 should have made contact with the ground in the landing motion of the leg 3, air is flowed into the bag-like member 6 to increase the height of the bag-like member 19, so that the landing shock of the leg 3 can be reliably reduced even if the foot mechanism 6 is lowered in order to rapidly bring the foot mechanism 6 of the leg 3 into contact with the ground.

The height Hact of the bag-like member 19, being detected by the linear potentiometer 30 according to the third and fourth embodiments, may be detected by a distance-measuring sensor using laser beam or the like. Furthermore, since pressure inside of the bag-like member 19 during inflation, in general, has correlation with the height of the bag-like member 19, the pressure inside of the bag-like member 19 may be detected by a pressure sensor to perform the opening and closing control of the solenoid valve 27 based on the detected pressure, thereby controlling the height of the bag-like member 19 during inflation.

Figure 11:
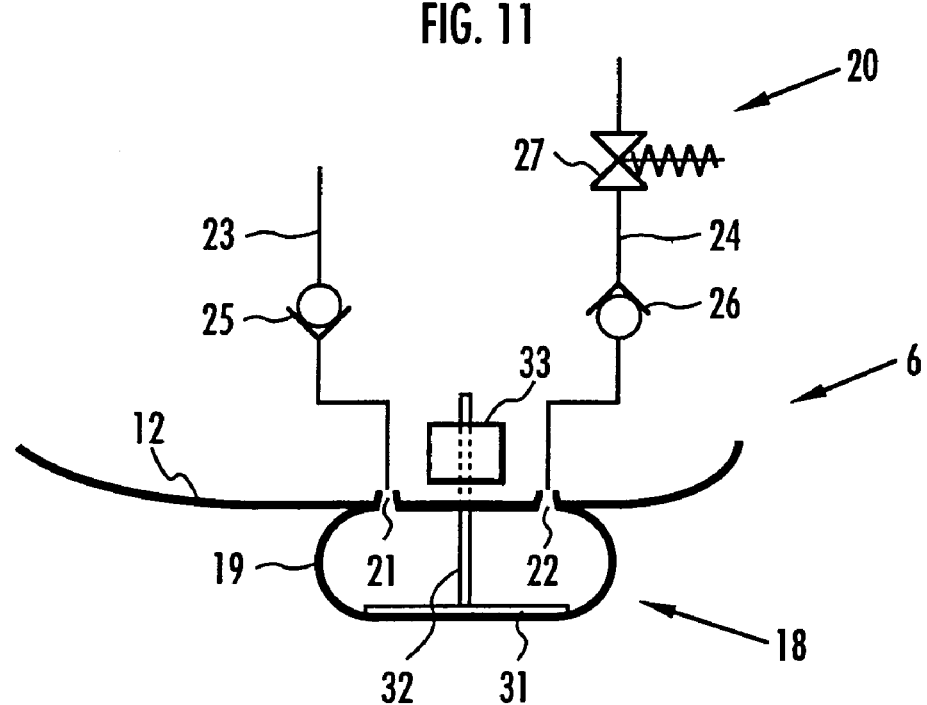
FIG. 11 is an exemplary view of a substantial part of a foot mechanism in a modified aspect relating to the first through fourth embodiments of the present invention.
Figure 12:
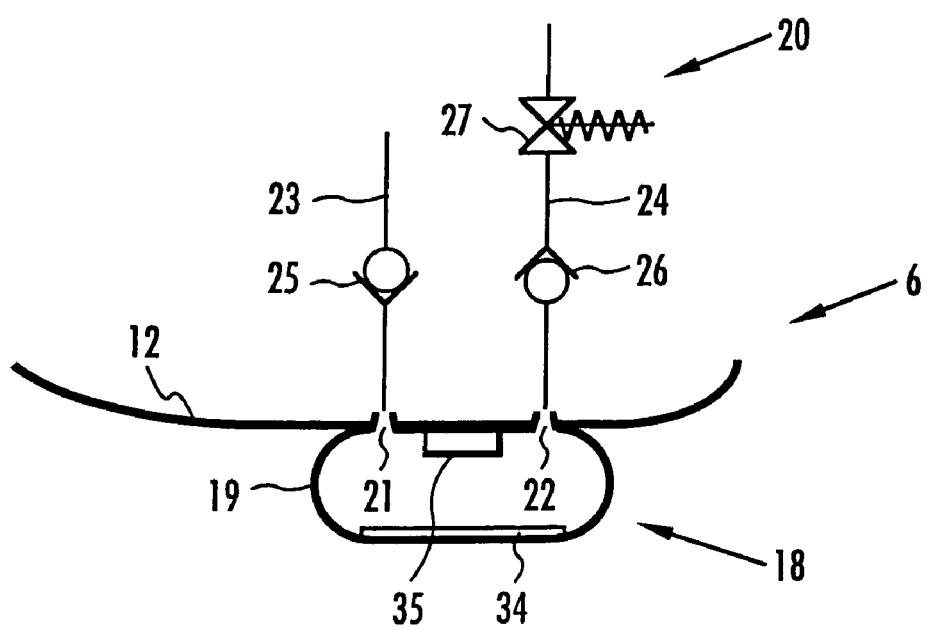
FIG. 12 is an exemplary view of a substantial part of a foot mechanism in a modified aspect relating to the first through fourth embodiments of the present invention.

Furthermore, although according to the above-described first through fourth embodiments, the air inflow into the bag-like member 19 is controlled through the solenoid valve 27 in order to maintain the bag-like member 19 in the compressed state or in order to control the height of the bag-like member 19 during inflation, for example, mechanical means as shown in FIG. 11 or electromagnetic means as shown in FIG. 12 may be used in order to control the inflation and compression of the bag-like member 19. In FIGS. 11 and 12, substantial parts of the foot mechanisms 6 are illustrated as in FIG. 8.

In the example shown in FIG. 11, as in the third embodiment, a plate member 31 is fixedly provided at the bottom face portion inside of the bag-like member 19, and a rod member 32 extending upward from this plate member 31 slidably penetrates the foot plate member 12 in the vertical direction (the compression direction of the bag-like member 19) to project to the upper side of the foot plate member 12. In addition, on the rod member 32, there is loaded a one-way clutch mechanism 33, which enables the rod member 32 to freely move in the compression direction of the bag-like member 19 (the direction in which the rod member 32 moves up), and the rod member 32 to be locked by a command given by the controller 10 or the like in the inflation direction of the bag-like member 19 (the direction in which the rod member 32 moves down). In the case where such a mechanism is provided, the rod member 32 is maintained locked by the one-way clutch mechanism 33 from after the bag-like member 19 enters the compressed state by the landing motion of the leg 3 (after the foot mechanism 6 makes contact with the ground through the front and rear ground-contacting members 17) until immediately after the leg 3 shifts from the landing state to the lifting state (the timing when the solenoid valve 27 is switched from the closing state to the opening state immediately after shifting into the lifting state in the first through fourth embodiments), whereby the bag-like member 19 can be maintained in the compressed state as in the first through fourth embodiments. In this case, locking the rod member 32 enables the bag-like member 19 to more reliably be maintained in the compressed state. Furthermore, in the lifting state of the leg 3, the rod member 32 is locked by the one-way clutch mechanism 33 at the timing of switching the solenoid valve 27 from the opening state to the closing state according to the first through fourth embodiments, thereby more reliably controlling the height of the bag-like member 19 to be a desired height.

Furthermore, in the example shown in FIG. 12, at the bottom face portion inside of the bag-like member 19, there is fixedly provided a plate-like magnetic element 34, and at an upper face portion inside of the bag-like member 19 (at a lower face portion of the foot plate member 12) there is fixedly provided an electromagnet 35. In the case where such electromagnetic means is provided, adsorptivity is generated with respect to the magnetic element 34 by the electromagnet 35 from after the bag-like member 19 enters the compressed state by the landing motion of the leg 3 (after the foot mechanism 6 makes contact with the ground through the front and rear ground-contacting members 17) until immediately after the leg 3 shifts from the landing state to the lifting state (the timing when the solenoid valve 27 is switched from the closing state to the opening state immediately after shifting to the lifting state in the first through fourth embodiments), thereby more reliably maintaining the bag-like member 19 in the compressed state.

Figure 13:
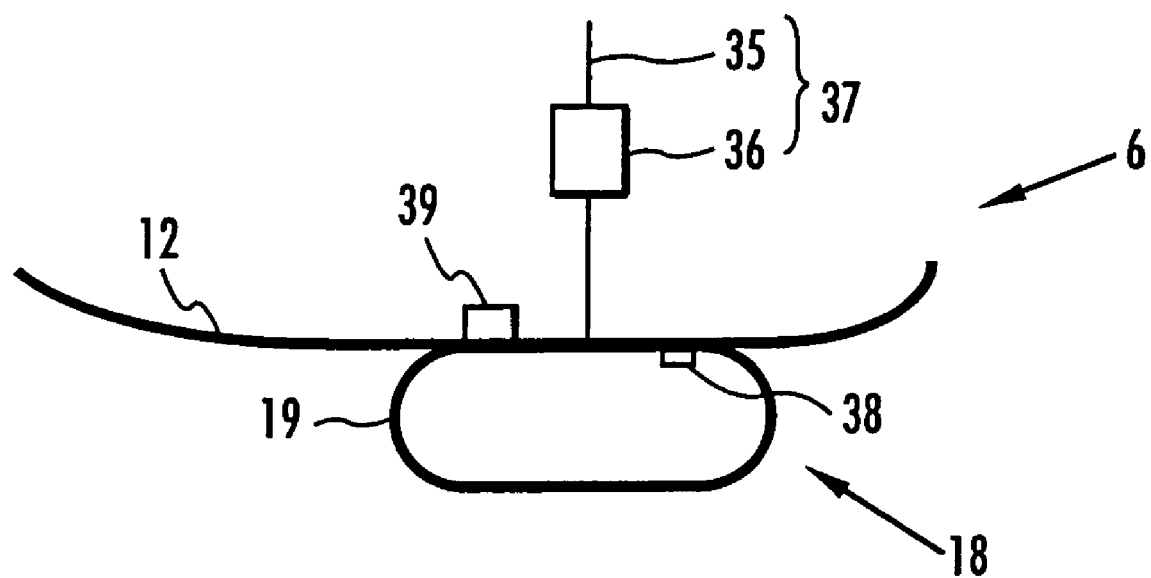
FIG. 13 is an exemplary view of a substantial part of a foot mechanism provided with a landing shock absorbing device of a fifth embodiment of the present invention.
Figure 14:
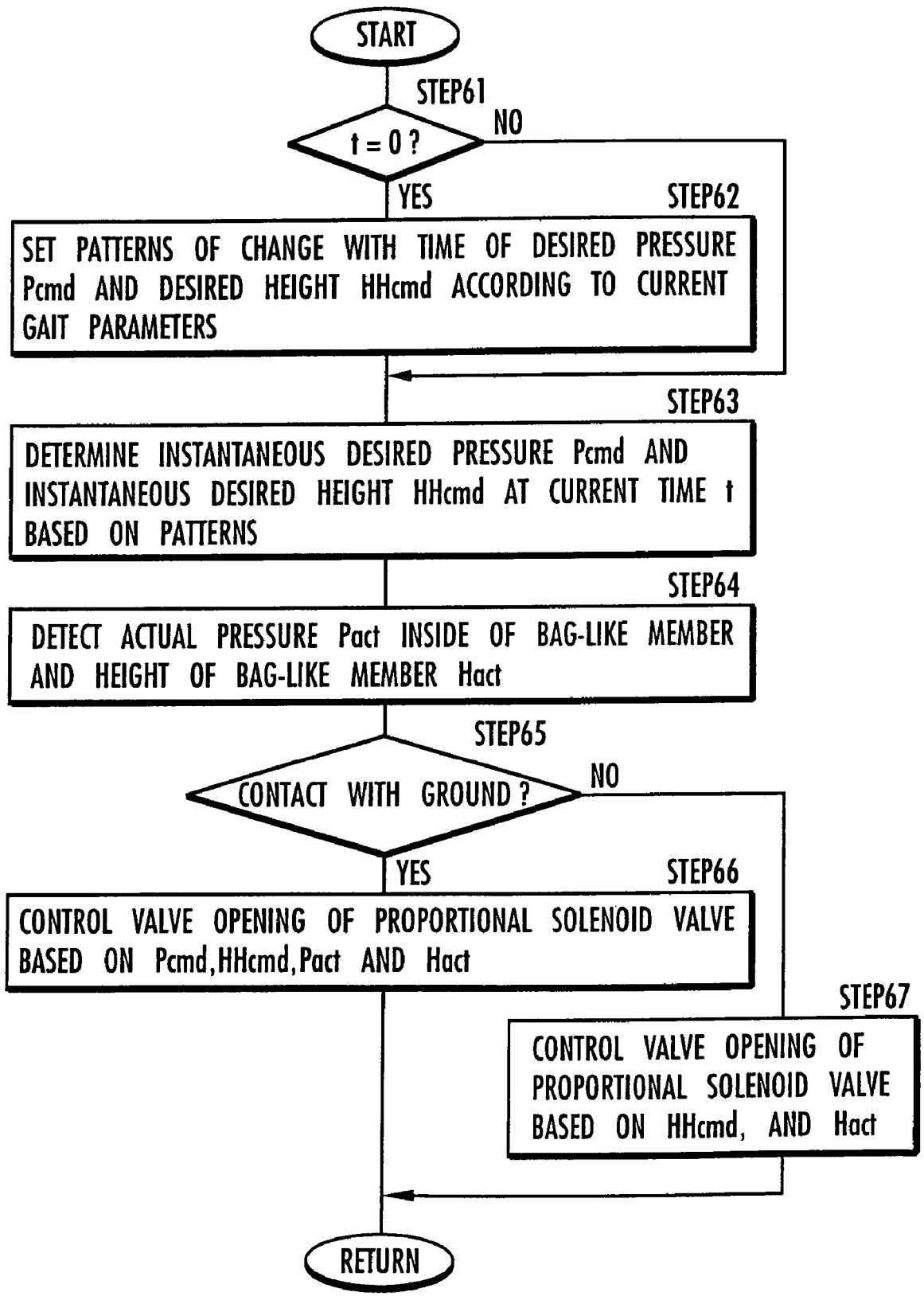
FIG. 14 is a flowchart for explaining an operation of the landing shock absorbing device of the foot mechanism in FIG. 13, FIG. 15 are timing charts for explaining the operations of the landing shock absorbing device of the foot mechanism in FIG. 13.

Subsequently, a fifth embodiment of the present invention is described referring to FIGS. 13 through 15. FIG. 13 is an exemplary view showing a substantial part of a foot mechanism provided with a landing shock absorbing device of the present embodiment, FIG. 14 is a flowchart for explaining an operation of the substantial part of the present embodiment, and FIGS. 15 are timing charts for explaining the operation of the present embodiment. According to the present embodiment, the foot mechanism is the same as that of the first embodiment except for the configuration relating to the landing shock absorbing device, and in FIG. 13, only the substantial configuration of the foot mechanism is illustrated. Furthermore, in the descriptions of the present embodiment, for the same component portions or functional portions as those of the first embodiment, reference numerals identical to those of the first embodiment are used, and descriptions are omitted.

Referring to FIG. 13, the landing shock absorbing device 18 of the present embodiment is provided with inflow/outflow means 37 made of a fluid conduit 35 led out from the bag-like member 19 side in communication with the interior portion of the bag-like member 19 attached to the bottom face of the foot plate member 12, and a proportional solenoid valve 36 which is provided at this fluid conduit 35 and whose opening can be controlled by the controller 10. Furthermore, a pressure sensor 38 is provided inside of the bag-like member 19 and a distance-measuring sensor 39 detecting the height of the bag-like member 19 is further provided on the foot plate member 12. The distance-measuring sensor 39 detects the height of the bag-like member 19 using laser beam, for example. Outputs of these sensors 38 and 39 (detection signals) are input into the controller 10. Configurations other than the foregoing are completely similar to those of the first embodiment.

Furthermore, according to the embodiment, the control processing of the controller 10 differs from the first embodiment only in the processing in STEP 6 of FIG. 4, and in this STEP 6, the proportional solenoid valve 36 is controlled for each leg 3 as shown in the flowchart of FIG. 14.

Specifically, the controller 10 first judges whether or not the current time t satisfies t=0, that is, whether or not starting timing of the supporting leg stage of the leg 3 (STEP 61) is presented, and in the case of t=0, patterns of change with time of a desired pressure Pcmd inside of the bag-like member 19 and change with time of a desired height HHcmd of the bag-like member 19 are set according to the current gait parameters (STEP 62). In this case, the patterns of the desired pressure Pcmd and the desired height HHcmd are, for example, set as shown in FIGS. 15A and 15B, respectively.

More specifically, the desired height HHcmd is set so as to monotonously decrease from an initial value HHcmd0 to "0" in a period Ta immediately after start of the supporting leg stage (immediately after ground contact of the bag-like member 19 of the foot mechanism 6) (the period Ta is basically a period until the foot mechanism 6 completely makes contact with the ground through the front and rear ground-contacting members 17). Then, in a period Tb from time when the period Ta elapses until the early free leg stage of the leg 3 (immediately after the leg shifts from the landing state to the lifting state), the desired height HHcmd is maintained at "0". HHcmd= 0 denotes a height of the bag-like member 19 in the state that the foot mechanism 6 makes contact with the ground through the front and rear ground-contacting members 17 and that the bag-like member 19 is completely compressed. Furthermore, from time when the period Tb elapses until the free-leg stage ends, the desired height HHcmd is increased to a predetermined value HHcmd1 and in the end, maintained at the predetermined value HHcmd1. Here, the predetermined value HHcmd1 is equivalent to the desired height Hcmd in the third and fourth embodiments. Furthermore, the initial value HHcmd0 of the desired height HHcmd at start time of the supporting leg stage is equivalent to the final desired height HHcmd (HHcmd1) in the free leg stage before the supporting leg stage. In this case, the final desired height HHcmd1 in the free leg stage, a length of the period Tb, and the like are set according to the movement speed of the robot 1 or the like as in the first through fourth embodiments.

Furthermore, basically, the desired pressure Pcmd is set so as to temporarily increase from "0", and then to decrease to "0" in the period Ta in the early supporting leg stage of the leg 3. In addition, after the period Ta elapses, Pcmd=0 is maintained until the free leg stage ends. Pcmd=0 denotes that the pressure inside of the bag-like member 19 is equivalent to the atmospheric pressure. In this case, a maximum value and the like of the desired pressure Pcmd in the free leg stage are set according to the gait parameters, and basically, as the movement speed of the robot 1 is higher, the maximum value of the desired pressure Pcmd is set at a larger value.

After setting the patterns of change with time of the desired pressure Pcmd and the desired height HHcmd, as described above, or when t=0 is not satisfied in STEP 1, the controller 10 determines an instantaneous desired pressure Pcmd and an instantaneous desired height HHcmd at the current time t based on the above patterns (STEP 63).

Subsequently, the controller 10 detects an actual pressure Pact inside of the bag-like member 19 by the pressure sensor 38, and the actual height Hact of the bag-like member 19 by the distance-measuring sensor 39 (STEP 64), and thereafter, the controller 10 judges whether or not the foot mechanism 6 is in contact with the ground through the bag-like member 19 or the ground-contacting members 17 (STEP65). This judgment is made based on, for example, a detected value of the actual pressure Pact by the six-axis force sensor 15 or the pressure sensor 38.

When the foot mechanism 6 is in contact with the ground, the controller 10 controls the opening of the proportional solenoid valve 36 based on the instantaneous desired pressure Pcmd and the instantaneous desired height HHcmd determined in STEP 63, and the actual pressure Pact inside of the bag-like member 19 and the actual height Hact of the bag-like member 19 detected in STEP 64 (STEP 66). In this case, the controller 10 determines the opening of the pro-portional solenoid valve 36 (hereinafter, referred to as valve opening), for example, by the following formula (1) to control the proportional solenoid valve 36 for the determined valve opening.

$$\text{Valve opening} = k1 \cdot (Pact - Pcmd) + k2 \cdot (Hact - HHcmd) \qquad (1)$$

Here, k1 and k2 in the formula (1) are predetermined positive gain coefficients. In addition, when a calculation result on the right-hand side of the formula (1) is a negative value, the valve opening is forcefully set at "0" (valve closing state of the proportional solenoid valve 36).

Furthermore, in STEP 65, when the foot mechanism 6 is not in contact with the ground, the controller 10 controls the opening of the proportional solenoid valve 36 based on the instantaneous desired height HHcmd determined in STEP 63 and the actual height Hact of the bag-like member 19 detected in STEP 64 (STEP 67). In this case, the controller 10 determines the valve opening, for example, by the following formula (2) to control the proportional solenoid valve 36 for the determined valve opening.

$$\text{Valve opening} = -k3 \cdot (Hact - HHcmd) \qquad (2)$$

Here, k3 in the formula (2) is a predetermined positive gain coefficient. In addition, when a calculation result on the right-hand side of the formula (2) is a negative value, the valve opening is forcefully set at "0" (valve closing state of the proportional solenoid valve 36).

In the ground-contacting state of the foot mechanism 6 (including the bag-like member 19), that is, in the supporting leg stage of the leg 3, the above-described control of the valve opening of the proportional solenoid valve 36, in other words, the control of air inflow into the bag-like member 19 enables the actual pressure Pact inside of the bag-like member 19 and the actual height Hact of the bag-like member 19 to basically vary so as to generally follow the patterns of the desired pressure Pcmd and the desired height HHcmd, respectively. Furthermore, in the state that the foot mechanism 6 is not in contact with the ground, that is, in the free leg stage of the leg 3, the actual height Hact of the bag-like member 19 varies so as to follow the pattern of the desired height HHcmd. In this case, since the pattern of the desired height HHcmd is set as described above, the bag-like member 19 is basically maintained in the compressed state from after the compression by the landing motion of the leg 3 until immediately after the leg 3 shifts from the landing state to the lifting state. Furthermore, in the free leg stage of the leg 3, the bag-like member 19 inflates to the height according to the gait parameters defining the gait type of the robot 1. Accordingly, the same operation and effect as those of the first embodiment can be brought about. Furthermore, according to the present embodiment, in the ground-contacting state of the foot mechanism 6, the actual pressure Pact inside of the bag-like member 19 is also controlled so as to generally follow the desired pressure Pcmd according to the gait parameters, so that a reduction effect of the landing shock by the landing shock absorbing device 18 can be suitable for the gait type of the robot 1.

Although according to the present embodiment, in the ground-contacting state of the foot mechanism 6, the valve opening of the proportional solenoid valve 36 is determined by the formula (1), the valve opening may be determined, for example, by the following formula (3) or (4).

$$\text{Valve opening} = k1 \cdot (Pact - Pcmd) - k2 \cdot HHcmd \quad (3)$$

$$\text{Valve opening} = -k1 \cdot Pcmd + k2 \cdot (Hact - HHcmd) \quad (4)$$

When using these formulas (3) and (4), in the supporting leg stage of the leg 3, basically, the actual pressure Pact inside of the bag-like member 19 and the actual height Hact of the bag-like member 19 can also be varied to generally follow the patterns of the desired pressure Pcmd and the desired height HHcmd, respectively.

Although according to the present embodiment, the patterns of the desired pressure Pcmd and the desired height HHcmd are set, for example, only the pattern of the desired height HHcmd may be set to control the proportional solenoid valve 36 so as to allow the actual height Hact of the bag-like member 19 to follow the set pattern. In this case, in either of the supporting leg stage and the free leg stage, the valve opening of the proportional solenoid valve 36 may be determined, for example, by the formula (2).

Figure 16:
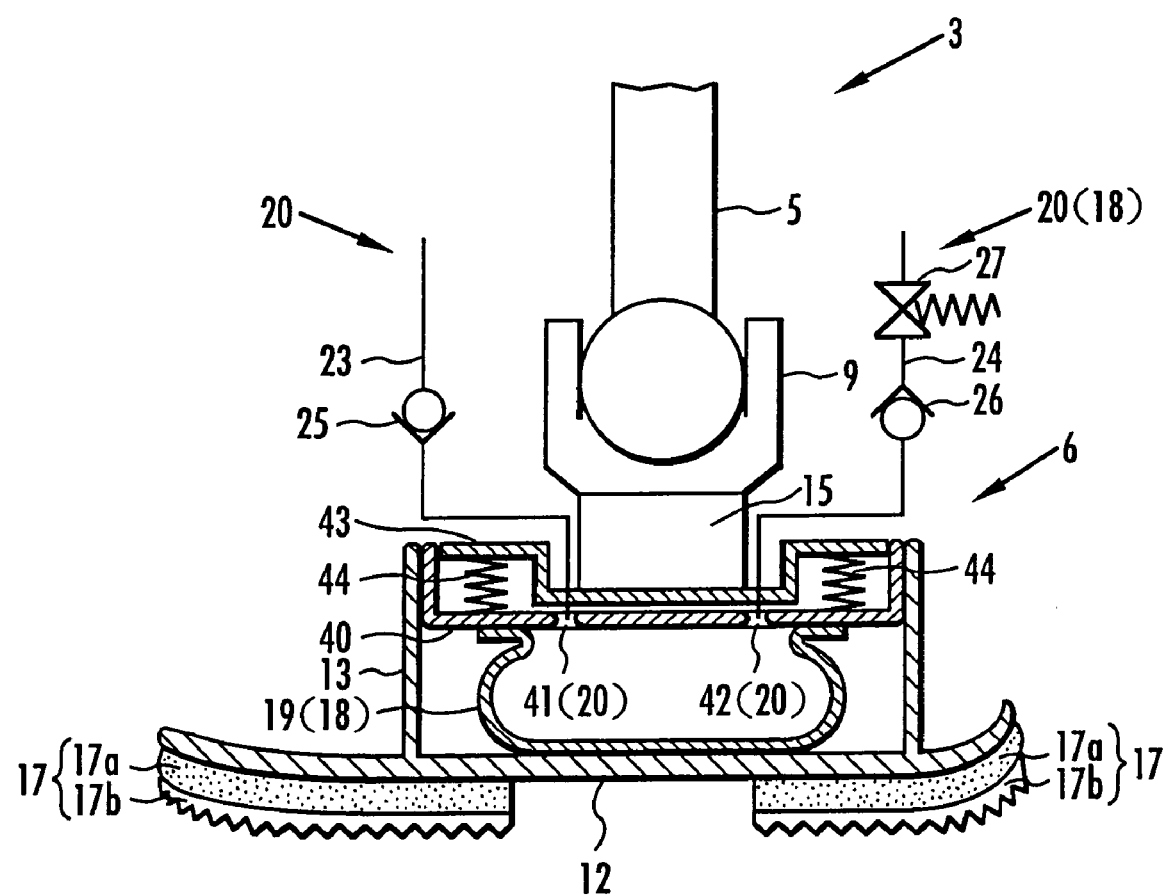
FIG. 16 is a cross-sectional view of a side face of a foot mechanism provided with a landing shock absorbing device of a sixth embodiment of the present invention.

Although according to the first through fifth embodiments as described above, the bag-like member 19 is provided at the bottom face side of the foot plate member 12, the bag-like member 19 may be provided, for example, between the foot plate member 12 and the ankle joint 9. An embodiment of this case is described as a sixth embodiment referring to FIG. 16. FIG. 16 is a cross-sectional view of a side face of a foot mechanism provided with a landing shock absorbing device of the present embodiment. Since the present embodiment differs from the first embodiment only in a part of configuration of the foot mechanism and a part of configuration of the landing shock absorbing device, for the same component portions or functional portions as those of the first embodiment, the same reference numerals identical to those of the first embodiment are used and descriptions are omitted.

According to the present embodiment, in an upper face portion of the foot mechanism 6, the tube member 13 in a cross-sectionally rectangular form is fixedly provided as in the first embodiment, and inside of the tube member 13, there is housed the bag-like member 19 (a variable capacity element) having an upwardly opened barrel shape similar to the bag-like member of the first embodiment. In this case, the bottom face portion of the bag-like member 19 is firmly fixed to the foot plate member 12 inside of the tube member 13. Furthermore, inside of the tube member 13, movable tube member 40 with a bottom is housed on an upper side of the bag-like member 19, and this movable tube member 40 is disposed movably along an inner circumferential surface of the tube member 13 in the vertical direction. In addition, an opening end of the bag-like member 19 is fixedly provided at a bottom portion of the movable tube member 40. Accordingly, the movable tube member 40 is joined to the foot plate member 12 through the bag-like member 19. Furthermore, two flow holes 41 and 42 are drilled at the bottom portion of the movable tube member 40 communicatively with the interior portion of the bag-like member 19. These flow holes 41 and 42 are throttled passages.

Furthermore, inside of the movable tube member 40, there is housed a movable plate 43 which can move in the substantially vertical direction along an inner circumferential surface of the movable tube member 40, and the movable plate 43 is connected to the bottom portion of the movable tube member 40 through a plurality of elastic members 44 (described as a spring in the figure) with a peripheral portion of its lower face constructed of a spring, rubber, or the like. In addition, the ankle joint 9 of the leg 3 is connected to an upper face portion of this movable plate 43 through the six-axis force sensor 15.

Furthermore, the inflow/outflow means 20 including the flow holes 41 and 42 are provided. This inflow/outflow means 20 is the same as that of the first embodiment in basic configuration, comprising the fluid conduit 23 connected to, and led out from the fluid hole 41, the check valve 25 provided in this fluid conduit 23, the fluid conduit 24 connected to, and led out from the fluid hole 42, and the check valve 26 and the solenoid valve 27 provided in this fluid conduit 24. In addition, far end portions of the fluid conduits 23 and 24 are opened to the atmosphere side. The landing shock absorbing device 18 of the present embodiment is constructed of this inflow/outflow means 20 and the bag-like member 19.

According to the present embodiment, the bag-like member 19 is constructed of an elastic material which is hard to stretch more than the inflation state shown in the figure (the natural state) to prevent the movable tube member 40 from falling off from the tube member 13 due to the bag-like member 19 extended by weight of foot plate member 12 and the like in the lifting state of the leg 3. Alternatively, the movable tube member 40 is structurally adapted not to fall off from the tube member 13. Configurations other than the foregoing (including the control processing of the controller 10) are identical to those of the first embodiment.

In the landing shock absorbing device 18 of the present embodiment configured as described above, in the landing motion of the leg 3, when the foot mechanism 6 of the leg 3 makes contact with the ground through the ground-contacting members 17, air inside of the bag-like member 19 flows out through the flow hole 41 while compressing the bag-like member 19. At this time, since the flow passage 41 is a throttled passage, outflow resistance occurs. Such an operation of the landing shock absorbing device 18 of the present embodiment reduces the landing shock in the landing motion of the leg 3 as in the first and the second embodiments. Furthermore, by the opening and closing control of the solenoid valve 27 similar to the first embodiment, the bag-like member 19 is maintained in the compressed state from after the compression of the bag-like member 19 until immediately after the foot mechanism 6 shifts from the landing state to the lifting state. Moreover, in the lifting state of the foot mechanism 6, the bag-like member 19 inflates to a desired height. This can bring about the same operation and effect as those of the first embodiment.

Although according to the present embodiment, the control of air inflow into the bag-like member 19 is performed similar to the first embodiment, air inflow into the bag-like member 19 can also be controlled similar to the second through fourth embodiments.

Furthermore, although according to the present embodiment, the bag-like member 19 is provided as a variable capacity element, it is possible that the tube member 13 is formed into a cylindrical (cylinder tube-like) shape for example, that the movable tube member 40 is formed into a piston form, and that the bag-like member 19 is configured as a variable capacity element in a space under the movable tube member 40 inside of the tube member 13.

Furthermore, although according to the first through sixth embodiments, the fluid flowing in and out with respect to the variable capacity element is air, the fluid may be a liquid such as hydraulic oil in the present invention.

INDUSTRIAL APPLICABILITY

As described above, the present invention can provide a landing shock absorbing device which can easily secure posture stability of a legged mobile robot such as a biped mobile robot while reducing an impact load during a landing motion of a leg of the robot, and further, which can be configured to be lightweight.

What is claimed is:

1. A landing shock absorbing device of a legged mobile robot moving by lifting and landing motions of a plurality of legs that can make contact with the ground through a ground-contacting face portion of a foot mechanism, respectively, comprising:

a variable capacity element provided in the foot mechanism of each leg, each variable capacity element being compressed by undergoing a floor reaction force during the landing motion of an associated leg and being inflatable when no longer undergoing the floor reaction force at least by the lifting motion of the associated leg, thereby allowing fluid to flow into the variable capacity element with the inflation and to flow out of an interior portion of the variable capacity element with the compression thereof; and an inflow/outflow means for communicating the fluid into the variable capacity element while inflating the variable capacity element in a lifting state of the associated leg and flowing communicating the fluid out of the variable capacity element with the compression of the variable capacity element caused by the floor reaction force, wherein outflow resistance is generated during the outflow of the fluid in the variable capacity element by the inflow/outflow means, the landing shock absorbing device comprising compressed state maintaining means for maintaining the variable capacity element in the compressed state in a period from after the variable capacity element is compressed at least by the landing motion of the associated leg until immediately after the associated leg enters the lifting state by the lifting motion thereof, wherein the variable capacity element is constructed of a deformable bag-like member provided on a bottom face side of the foot mechanism of the associated leg to make contact with the ground ahead of the ground-contacting face portion of the foot mechanism of the associated leg during the landing motion of said associated leg.

2. The landing shock absorbing device according to claim 1, wherein the fluid comprises a compressible fluid.

3. The landing shock absorbing device according to claim 2, wherein the legged mobile robot comprises a robot in which a position and a posture of the foot mechanism are controlled by compliance control so as to allow a moment about an axis in a horizontal direction for the floor reaction force acting on the foot mechanism of each leg to follow a predetermined desired moment.

4. A landing shock absorbing device of a legged mobile robot moving by lifting and landing motions of a plurality of legs that can make contact with the ground through a ground-contacting face portion of a foot mechanism, respectively, comprising:

a variable capacity element provided in the foot mechanism of each leg, each variable capacity element being compressed by undergoing a floor reaction force during the landing motion of an associated leg and being inflatable when no longer undergoing the floor reaction force at least by the lifting motion of the associated leg, thereby allowing fluid to flow into the variable capacity element with the inflation and to flow out of an interior portion of the variable capacity element with the compression thereof; and an inflow/outflow means for communicating the fluid into the variable capacity element while inflating the variable capacity element in a lifting state of the associated leg and for communicating the fluid out of the variable capacity element with the compression of the variable capacity element caused by the floor reaction force, wherein outflow resistance is generated during the outflow of the fluid in the variable capacity element by the inflow/outflow means, the landing shock absorbing device comprising compressed state maintaining means for maintaining the variable capacity element in the compressed state in a period from after the variable capacity element is compressed at least by the landing motion of the associated leg until immediately after the associated leg enters the lifting state by the lifting motion thereof, wherein the compressed state maintaining means maintains the variable capacity element in the compressed state by blocking off inflow of the fluid into the variable capacity element at least by the inflow/outflow means.

5. The landing shock absorbing device according to claim 4, wherein the fluid comprises a compressible fluid.

6. The landing shock absorbing device according to claim 5, wherein the legged mobile robot comprises a robot in which a position and a posture of the foot mechanism are controlled by compliance control so as to allow a moment about an axis in a horizontal direction for the floor reaction force acting on the foot mechanism of each leg to follow a predetermined desired moment.

7. A landing shock absorbing device of a legged mobile robot moving by lifting and landing motions of a plurality of legs that can make contact with the ground through a ground-contacting face portion of a foot mechanism, respectively, comprising:

a variable capacity element provided in the foot mechanism of each leg, each variable capacity element being compressed by undergoing a floor reaction force during the landing motion of an associated leg and being inflatable when no longer undergoing the floor reaction force at least by the lifting motion of the associated leg, thereby allowing fluid to flow into the variable capacity element with the inflation and to flow out of an interior portion of the variable capacity element with the compression thereof; and an inflow/outflow means for communicating the fluid into the variable capacity element while inflating the variable capacity element in a lifting state of the associated leg and for communicating the fluid out of the variable capacity element with the compression of the variable capacity element caused by the floor reaction force, wherein outflow resistance is generated during the outflow of the fluid in the variable capacity element by the inflow/outflow means, the landing shock absorbing device comprising compressed state maintaining means for maintaining the variable capacity element in the compressed state in a period from after the variable capacity element is compressed at least by the landing motion of the associated leg until immediately after the associated leg enters the lifting state by the lifting motion thereof, wherein the compressed state maintaining means judges a period of time when the variable capacity element is maintained in the compressed state based on time information of the lifting/landing motions of the associated leg that is determined according to a desired gait during the movement of the legged mobile robot.

8. The landing shock absorbing device according to claim 7, wherein the fluid comprises a compressible fluid.

9. The landing shock absorbing device according to claim 8, wherein the legged mobile robot comprises a robot in which a position and a posture of the foot mechanism are controlled by compliance control so as to allow a moment about an axis in a horizontal direction for the floor reaction force acting on the foot mechanism of each leg to follow a predetermined desired moment.

10. A landing shock absorbing device of a legged mobile robot moving by lifting and landing motions of a plurality of legs that can make contact with the ground through a ground-contacting face portion of a foot mechanism, respectively, comprising:

a variable capacity element provided in the foot mechanism of each leg, each variable capacity element being compressed by undergoing a floor reaction force during the landing motion of an associated leg and being inflatable when no longer undergoing the floor reaction force at least by the lifting motion of the associated leg, thereby allowing fluid to flow into the variable capacity element with the inflation and to flow out of an interior portion of the variable capacity element with the compression thereof; and an inflow/outflow means for communicating the fluid into the variable capacity element while inflating the variable capacity element in a lifting state of the associated leg and for communicating the fluid out of the variable capacity element with the compression of the variable capacity element caused by the floor reaction force, wherein outflow resistance is generated during the outflow of the fluid in the variable capacity element by the inflow/outflow means, the landing shock absorbing device comprising compressed state maintaining means for maintaining the variable capacity element in the compressed state in a period from after the variable capacity element is compressed at least by the landing motion of the associated leg until immediately after the associated leg enters the lifting state by the lifting motion thereof, wherein the landing shock absorbing device further comprises a sensor for detecting whether or not the foot mechanism of each leg is in contact with the ground through the ground-contacting face portion, wherein the compressed state maintaining means judges a period of time when the variable capacity element is maintained in the compressed state based on detection data of the sensor.

11. The landing shock absorbing device according to claim 10, wherein the fluid comprises a compressible fluid.

12. The landing shock absorbing device according to claim 11, wherein the legged mobile robot comprises a robot in which a position and a posture of the foot mechanism are controlled by compliance control so as to allow a moment about an axis in a horizontal direction for the floor reaction force acting on the foot mechanism of each leg to follow a predetermined desired moment.

13. A landing shock absorbing device of a legged mobile robot moving by lifting and landing motions of a plurality of legs that can make contact with the ground through a ground-contacting face portion of a foot mechanism, respectively, comprising:

a variable capacity element provided in the foot mechanism of each leg, each variable capacity element being compressed by undergoing a floor reaction force during the landing motion of an associated leg and being inflatable when no longer undergoing the floor reaction force at least by the lifting motion of the associated leg, thereby allowing fluid to flow into the variable capacity element with the inflation and to flow out of an interior portion of the variable capacity element with the compression thereof; and an inflow/outflow means for communicating the fluid into the variable capacity element while inflating the variable capacity element in a lifting state of the associated leg and for communicating the fluid out of the variable capacity element with the compression of the variable capacity element caused by the floor reaction force, wherein outflow resistance is generated during the outflow of the fluid in the variable capacity element by the inflow/outflow means, the landing shock absorbing device comprising compressed state maintaining means for maintaining the variable capacity element in the compressed state in a period from after the variable capacity element is compressed at least by the landing motion of the associated leg until immediately after the associated leg enters the lifting state by the lifting motion thereof;

wherein the landing shock absorbing device further comprises inflation control means for controlling an inflow amount of the variable capacity element by the inflow/outflow means according to a gait type of the legged mobile robot so that a size of the variable capacity element in a compression direction becomes a predetermined size according to the gait type during the inflation of the variable capacity element in the lifting state of the associated leg.

14. The landing shock absorbing device according to claim 13, wherein the inflation control means judges whether or not the size of the variable capacity element in the compression direction has inflated to the predetermined size based on inflow time of the fluid into the variable capacity element after the operation of maintaining the variable capacity element in the compressed state by the compressed state maintaining means is released, and when judging that the size of the variable capacity element in the compression direction has inflated to the predetermined size, the inflation control means blocks off the inflow of the fluid into the variable capacity element by the inflow/outflow means.

15. The landing shock absorbing device according to claim 13, further comprising a sensor for detecting a physical quantity that varies according to the size of the variable capacity element in the compression direction, wherein the inflation control means judges whether or not the size of the variable capacity element in the compression direction has inflated to the predetermined size based on detection data of the sensor after the operation of maintaining the variable capacity element in the compressed state by the compressed state maintaining means is released, and when judging that the size of the variable capacity element in the compression direction has inflated to the predetermined size, the inflation control means blocks off the inflow of the fluid into the variable capacity element by the inflow/outflow means.

16. The landing shock absorbing device according to claim 13, further comprising a first sensor for detecting a pressure inside of the variable capacity element and a second sensor for detecting the size of the variable capacity element in the compression direction, wherein the compressed state maintaining means and the inflation control means set a pattern of change with time of a desired pressure inside of the variable capacity element and a pattern of change with time of a desired size of the variable capacity element in the compression direction according to the gait type of the legged mobile robot, and control the inflow/outflow of the fluid into the variable capacity element by the inflow/outflow means so that the pressure and the size detected by the first sensor and the second sensor, respectively, vary in keeping with the patterns of change with time of the desired pressure and the desired size, respectively.

17. A landing shock absorbing device of a legged mobile robot moving by lifting and landing motions of a plurality of legs that can make contact with the ground through a ground-contacting face portion of a foot mechanism, respectively, comprising:
- a variable capacity element provided in the foot mechanism of each leg, each variable capacity element being compressed by undergoing a floor reaction force during the landing motion of an associated leg and being inflatable when no longer undergoing the floor reaction force at least by the lifting motion of the associated leg, thereby allowing fluid to flow into the variable capacity element with the inflation and to flow out of an interior portion of the variable capacity element with the compression thereof; and
- an inflow/outflow means for communicating the fluid into the variable capacity element while inflating the variable capacity element in a lifting state of the associated leg and for communicating the fluid out of the variable capacity element with the compression of the variable capacity element caused by the floor reaction force, wherein outflow resistance is generated during the outflow of the fluid in the variable capacity element by the inflow/outflow means, the landing shock absorbing device comprising compressed state maintaining means for maintaining the variable capacity element in the compressed state in a period from after the variable capacity element is compressed at least by the landing motion of the associated leg until immediately after the associated leg enters the lifting state by the lifting motion thereof, wherein the landing shock absorbing device further comprises compressed state maintaining means for maintaining the variable capacity element in the compressed state not by the floor reaction force.

\* \* \* \* \*

UNITED STATES PATENT AND TRADEMARK OFFICE
CERTIFICATE OF CORRECTION

| | |
|---|---|
| PATENT NO. | : 6,967,456 B2 |
| APPLICATION NO. | : 10/499117 |
| DATED | : November 22, 2005 |
| INVENTOR(S) | : Takenaka et al. |

It is certified that error appears in the above-identified patent and that said Letters Patent is hereby corrected as shown below:

Column 27, Line 28, (Claim 1, Line 19), delete "flowing" and insert --for--.

Column 30, Line 32, (Claim 13, Line 34), after "the" (first occurrence), insert --fluid into the--.

Signed and Sealed this

Thirtieth Day of October, 2007

JON W. DUDAS
*Director of the United States Patent and Trademark Office*